US007820025B2

(12) United States Patent
Ciampi et al.

(10) Patent No.: US 7,820,025 B2
(45) Date of Patent: Oct. 26, 2010

(54) METHODS OF SYNTHESIZING AN OXIDANT AND APPLICATIONS THEREOF

(75) Inventors: Lee Edward Ciampi, St. Paul, MN (US); Luke J Daly, Orlando, FL (US)

(73) Assignee: Ferrate Treatment Technologies, LLC, Orlando, FL (US)

( * ) Notice: Subject to any disclaimer, the term of this patent is extended or adjusted under 35 U.S.C. 154(b) by 0 days.

(21) Appl. No.: 12/352,405

(22) Filed: Jan. 12, 2009

(65) Prior Publication Data

US 2009/0120802 A1  May 14, 2009

Related U.S. Application Data

(63) Continuation of application No. 10/997,333, filed on Nov. 24, 2004, now Pat. No. 7,476,324, which is a continuation of application No. 10/824,268, filed on Apr. 14, 2004, now abandoned, which is a continuation-in-part of application No. 10/246,575, filed on Sep. 17, 2002, now Pat. No. 6,974,562, which is a continuation of application No. 10/047,460, filed on Jan. 14, 2002, now Pat. No. 6,790,429, which is a continuation-in-part of application No. 09/905,165, filed on Jul. 12, 2001, now abandoned.

(60) Provisional application No. 60/299,884, filed on Jun. 21, 2001, provisional application No. 60/218,409, filed on Jul. 14, 2000.

(51) Int. Cl.
C01G 49/00 (2006.01)

(52) U.S. Cl. ......................... 205/80; 205/543; 205/548; 134/2; 134/3; 210/716; 210/717; 210/758

(58) Field of Classification Search .................. 205/80, 205/543, 548; 422/28, 29; 134/2, 3; 210/716, 210/717, 758
See application file for complete search history.

(56) References Cited

U.S. PATENT DOCUMENTS

| 2,536,703 | A | | 1/1951 | Schreyer |
| 2,758,084 | A | | 8/1956 | Deyrup et al. |
| 2,758,090 | A | | 8/1956 | Mills et al. |
| 2,835,553 | A | | 5/1958 | Harrison et al. |
| 3,985,770 | A | | 10/1976 | Collman et al. |
| 4,198,296 | A | | 4/1980 | Doumas et al. |
| 4,304,760 | A | | 12/1981 | Mein et al. |
| 4,385,045 | A | | 5/1983 | Thompson |
| 4,405,573 | A | | 9/1983 | Deininger et al. |
| 4,435,256 | A | * | 3/1984 | Deininger ............... 205/548 |
| 4,435,257 | A | | 3/1984 | Deininger et al. |
| 4,435,265 | A | | 3/1984 | Birkle et al. |
| 4,451,338 | A | | 5/1984 | Deininger et al. |
| 4,500,499 | A | | 2/1985 | Kaczur et al. |
| 4,545,974 | A | | 10/1985 | Thompson |
| 4,551,326 | A | | 11/1985 | Thompson |
| 4,983,306 | A | | 1/1991 | Deininger et al. |
| 4,991,497 | A | | 2/1991 | Barkhau et al. |
| 5,202,108 | A | | 4/1993 | Deininger |
| 5,217,584 | A | | 6/1993 | Deininger |
| 5,234,603 | A | | 8/1993 | Potts |
| 5,284,642 | A | | 2/1994 | Evrard et al. |
| 5,370,857 | A | | 12/1994 | Deininger |
| 5,380,443 | A | | 1/1995 | Deininger et al. |
| 5,746,994 | A | | 5/1998 | Johnson |
| 5,997,812 | A | | 12/1999 | Burnham et al. |
| 6,187,347 | B1 | | 2/2001 | Patterson |
| 6,471,788 | B1 | | 10/2002 | Minevski et al. |

FOREIGN PATENT DOCUMENTS

| JP | 55-075925 | | 6/1980 |
| JP | 57-198276 | * | 12/1982 |
| JP | 58-110435 | | 7/1983 |
| JP | 05-504506 | | 7/1993 |
| JP | 06-171953 | | 6/1994 |
| WO | 97/33833 | * | 9/1997 |
| WO | WO 99 29628 A | | 6/1999 |
| WO | 01/21856 | * | 3/2001 |
| WO | WO 02/06160 A | | 1/2002 |

OTHER PUBLICATIONS

Jihui Qu et al., "Removal of Algae from Drinking Water by Ferrate" Annual lecture book of Japan Society on Water Environment, Mar. 15, 2000, Vo. $34^{th}$, p. 185.

Aubertin, N., et al., "Synthesis of potassium sulfatoferrate and its use in wastewater treatment", Revue des Sciences de L'Eau, vol. 9, No. 1, pp. 17-30 (1996).

Audette, R. J. et al., "Ferrate (VI) ion, a novel oxidizing agent", Tetrahedron Letters, No. 3, pp. 279-282 (1971).

Bartzatt, R., et al., "The kinetics of oxidation of low molecular weight aldehydes by potassium ferrate", Transition Met. Chem., vol. 11, pp. 414-416 (1986).

Bartzatt, R., et al., "Removal of nitrosamines from waste water by potassium ferrate oxidation", Archives of Environmental Health, vol. 46, No. 5, pp. 313-315 (1991).

Bartzatt, R., et al., "Removal of toxic metals and nonmetals from contaminated water", Journal of Toxicaology and Environmental Health, vol. 35, pp. 205-210, (1992).

BeMiller, J.N., et al., "Oxidation of carbohydrates with the ferrate (VI) ion", Tetrahedron Letters, No. 40, pp. 4143-4146, (1972).

Bouzek, K. et al., "Influence of anode material composition on the stability of electrochemically-prepared ferrate(VI) solutions", Journal of Chemical Technology and Biotechnology, vol. 74, pp. 1188-1194, (1999).

(Continued)

Primary Examiner—Steven Bos
(74) Attorney, Agent, or Firm—Knobbe Martens Olson & Bear LLP

(57) ABSTRACT

Novel devices for synthesizing ferrate and uses thereof are described. One aspect of the invention relates to devices and systems for synthesizing ferrate at a site proximal to the site of use.

17 Claims, 4 Drawing Sheets

OTHER PUBLICATIONS

Bouzek, K., et al. "Influence of anode material on current yields during ferrate(VI) production by anodic iron dissolution Part I: Current efficiency during anodic dissolution of grey cast iron to ferrate(VI) in concentrated alkali hydroxide solutions", Journal of Applied Electrochemistry, vol. 26, pp. 919-923, (1996).

Bouzek, K., et al., "Electrochemical production of ferrate(VI) using sinusoidal alternating current superimposed on direct current: grey and white cast iron electrodes", Electrochimica Acta, vol. 44, pp. 547-557 (1998).

Bouzek, K., et al., "Influence of electrolyte hydrodynamics on current yield in ferrate(VI) production by anodic iron dissolution", Collect. Czech. Chem. Commun., vol. 65, pp. 133-140, (2000).

Bouzek, K., et al., "The cyclic voltammetric study of ferrate(VI) production", Journal of Electroanalytical Chemistry, vol. 425, pp. 125-137, (1997).

Carr, J. D., et al., "Properties of ferrate (VI) in aquenous solution: an alternative oxidant in wastewater treatment", Proceedings of the Conference on Water Chlorination and Chemical Environmental Impact Health Effects, (Ed. Lewis Chelsea), pp. 1285-1298 (1985).

CiCi, M., et al., "Production of some coagulant materials from galvanizing workshop waste", *Waste Management*, vol. 17, No. 7, pp. 407-410, (1997).

de Luca, S.J., et al., "Quality improvement of biosolids by ferrate(VI) oxidation of offensive odour compounds", Wat. Sci. Tech. vol. 33(3), pp. 119-130, (1996).

Deininger, J.P, et al., "Developments in transurancic element polishing from radioactive wastewaters using ferrate($FEO_{4-2}$) chemical technology", Waste Manage. '90, vol. 1, pp. 789-795 (1990).

Denvir, A., et al. "Electrochemical generation of ferrate, Part I: Dissolution of an iron wool bed anode" Journal of Applied Electrochemistry, vol. 26, pp. 815-822, (1996).

Fagan, J., et al., "Biofouling control with ferrate (VI)", Environ. Sci. Technol., vol. 17, pp. 123-125 (1983).

Goff, H., et al., "Studies on the mechanism of isotopic oxygen exchange and reduction of ferrate (VI) ion $(FeO_{42-})^1$", Journal of the American Chemical Society, vol. 93, No. 23, (Nov. 17, 1971).

Gilbert, M., et al., "Analytical Notes-An investigation of the applicability of ferrate ion for disinfection", Water Technology/Quality, pp. 495-497, (Sep. 1976).

Grube, G., et al., "The electrolytic formation of the alkali salts of ferrous oxide and of ferric oxide", Z. Elektrochem., vol. 26, pp. 459-471, (1920).

Jiang, et al., Progress in the development and use of ferrate(VI) salt as an oxidant and coagulant for water and wastewater treatment, Water Research 36 (2002) 1397-1408.

Kazama, F., "Respiratory inhibition of *sphaeroblus* by potassium ferrate" Journal of Fermentation and Bioengineering, vol. 67, No. 6, pp. 369-373, (1989).

Kazama, F., "Viral inactiviation by potassium ferrate", Wat. Sci. Tech. , vol. 31, No. 5-6, pp. 165-168 (1995).

Kazama, F., et al., Oxidation of organic matters in waste waters and fluvic acid by potassium ferrate (VI), Department of Environmental Engineering, vol. 34, pp. 100-104 (1984). Abstract only.

Kazama, F., et al., "Oxidative changes of organic characters in the waters by ferrate (VI) treatment", Department of Environmental Engineering, vol. 35, pp. 117-122 (1984). Abstract Only.

Kiselev, Y.K., et al., "The preparation of alkali metal ferrate(VI)", Russian Journal of Inorganic Chemistry., vol. 34, No. 9, pp. 1250-1253, (1989).

Lescuras-Darrou, et al., Electrochemical ferrate generation for waste water treatment using cast irons with high silicon contents, Journal of Applied Electrochemistry 32: 57-63, 2002.

Licht, S., et al., "Chemical synthesis of battery grade super-iron barium and potassium Fe(VI) ferrate compounds", Journal of Power Sources, vol. 99, pp. 7-14, (2001).

Licht, S., et al., "$SrFeO_4$ synthesis, Fe(VI) characterization and the strontium super-iron battery", Electrochemistry Communications, vol. 3, pp. 340-345, (2001).

Licht, S., et al., "Insoluble Fe(VI) compounds: effects on the super-iron battery", Electrochemistry Communications, vol. 1, pp. 522-526, (1999).

Licht, S., et al., "Solid phase modifiers of the Fe(VI) cathode: effects on the super-iron battery", Electrochemistry Communications, vol. 1, pp. 527-531, (1999).

Licht, S., et al., "Energetic iron(VI) chemistry: the super-iron battery", Science, vol. 285, pp. 1039-1042, (Aug. 13, 1999).

Neveux, N., et al., "Synthesis of stabilized potassium ferrate and its applications in water treatment", EPD Congress, (Ed. B. Mishra), pp. 215-224, (1999).

Ozernoi, M.I., et al., "Sulfide ion oxidation by sodium ferrate(VI) in water", Ecol. Chem., vol. 4, No. 3, pp. 208-212, (1995).

Potts, M.E., et al., "Removal of radionuclides in wastewaters utilizing potassium ferrate(VI)", Water Environment Research, vol. 66, No. 2, pp. 107-109, (1994).

Powell Fabrication and Manufacturing Inc, Guide to Powell Products & Services, 30 pp, undated.

Powell Fabrication and Manufacturing Inc, drawing of Batch Bleach System, Apr. 25, 2002.

Scholder, R., "Recent investigations on oxometallates and double oxides", Angew. Chem. Internat. Edit., vol. 1, No. 4, pp. 220, (1962).

Schreyer, J.M., et al. "Stability of the ferrate(VI) ion in aqueous solution", Analytical Chemistry, vol. 23, No. 9, pp. 1312-1314, (1951).

Stoupine, D., et al., "The simulation of heavy metals removal from wastewaters by the sodium ferrate(VI) treatment", Proceedings of the International Conference on Environmental Engineering and Chemical Engineering, (ICEECE'97) (eds. Qian, Y. and Huanqin, C), South China University of Technology Press, Guangzhou, pp. 33-36, (1997).

Stoupine, D., et al., "The peculiarities of the iron oxides/hydroxides sediment formed in sodium ferrate(VI) use as coagulant in water treatment", Proceedings of the International Conference on Environmental Engineering and Chemical Engineering, (ICEECE'97) (eds. Qian, Y. and Huanqin, C), South China University of Technology Press, Guangzhou, pp. 29-32, (1997).

Stupin, D.Y., et al., "Coprecipitation of $^{152}$Eu with iron(III) hydroxide formed upon reduction of sodium ferrate(VI) in aqueous medium", Radiochemistry, vol. 37, No. 4, pp. 329-332 (1995).

Sylvester, P., et al., "Ferrate treatment for removing chromium from high-level radioactive tank waste". Environmental Science and Technology, vol. 35, No. 1, pp. 216-221, (2001).

Thompson, G., et al., J. Am. Chem. Soc., "New derivative of dinaphthylethane", vol. 73, pp. 1379-1381 (1951).

Venkatadri, A.S., et al., "Ferrate(VI) analysis by cyclic voltammetry", Analytical Chemistry, vol. 43, No. 8, pp. 1115-1119, (Jul. 1971).

Wagner, W.F., et al., "Factors affecting the stability of aqueous potassium ferrate(VI) solutions", Analytical Chemistry, vol. 24, pp. 1947-1948, (1952).

White, D.A., et al. "A preliminary investigation into the use of sodium ferrate in water treatment", Environmental Technology, vol. 19, pp. 1157-1161, (1998).

Williams, D. et al., "Preparation and alcohol oxidation studies of the ferrate (VI) ion, $FeO_{42}^-$", Inorganica Chimica Acta, vol. 8, pp. 177-183, (1974).

Wood, R. H., "The heat, free engergy and entropy of the ferrate (VI) ion", J. Am. Chem. Soc., vol. 80, pp. 2038-2041 (1957).

U.S. Appl. No. 10/047,460 Ciampi, et al., filed Jan. 14, 2002.

U.S. Appl. No. 10/246,575 Ciampi, et al., filed Sep. 17, 2002.

International Search Report and Written Opinion dated Jun. 30, 2006 in connection with PCT/US2005/013689.

International Preliminary Report on Patentability and Written Opinion of the International Searching Authority dated Oct. 26, 2006 from PCT/US2005/013689.

* cited by examiner

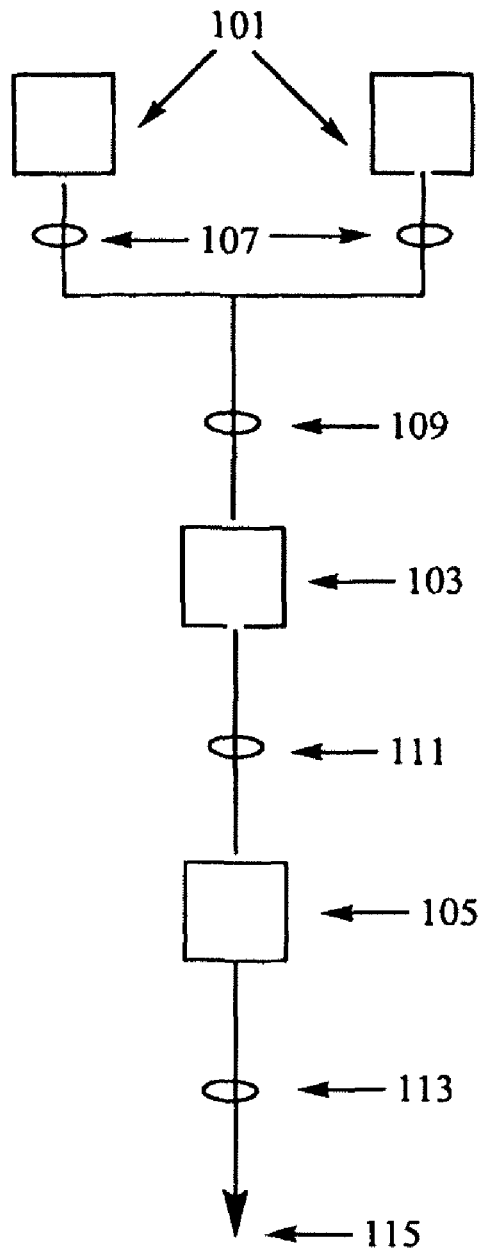
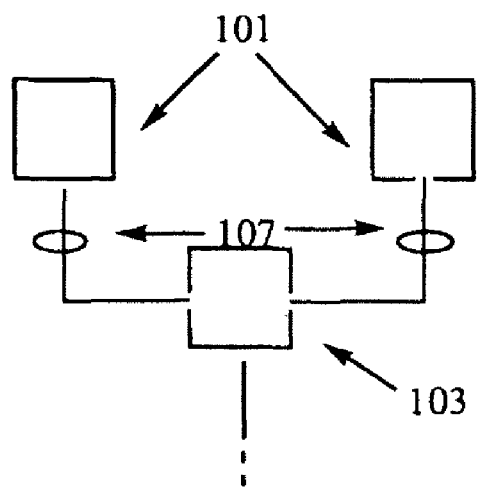
FIGURE 1B
FIGURE 1A
FIGURE 1

METHODS OF SYNTHESIZING AN OXIDANT AND APPLICATIONS THEREOF

CROSS-REFERENCE TO RELATED APPLICATIONS

The present application is a continuation of U.S. application Ser. No. 10/997,333, filed Nov. 24, 2004, entitled "METHODS OF SYNTHESIZING AN OXIDANT AND APPLICATIONS THEREOF," which is now U.S. Pat. No. 7,476,324, which in turn is a continuation of U.S. application Ser. No. 10/824,268, filed Apr. 14, 2004, now abandoned, which in turn is a continuation-in-part of U.S. application Ser. No. 10/246,575, filed Sep. 17, 2002, entitled "METHODS OF SYNTHESIZING AN OXIDANT AND APPLICATIONS THEREOF," which is now U.S. Pat. No. 6,974,562, which in turn is a continuation of U.S. application Ser. No. 10/047,460, filed Jan. 14, 2002, entitled "METHODS OF SYNTHESIZING AN OXIDANT AND APPLICATIONS THEREOF," which is now U.S. Pat. No. 6,790,429, which in turn is a continuation-in-part of the U.S. application Ser. No. 09/905,165, filed Jul. 12, 2001, now abandoned, which in turn claims priority to U.S. Provisional Application Ser. No. 60/218,409, filed Jul. 14, 2000, and U.S. Provisional Application Ser. No. 60/299,884, filed Jun. 21, 2001, all of which are incorporated by reference herein in their entirety, including any drawings.

BACKGROUND OF THE INVENTION

1. Field of the Invention

The present invention relates, generally, to the manufacture and the application of the ferrate ion. More particularly, the present invention relates to methods and systems for treating, with the ferrate ion, solutions containing impurities.

2. Description of the Related Art

The ferrate ion, $FeO_4^{2-}$, is a tetrahedral ion that is believed to be isostructural with chromate, $CrO_4^{2-}$, and permanganate, $MnO_4^-$. The ferrate ion has been suggested to exist in aqueous media as the tetrahedral species $FeO_4^{2-}$. Redox potentials for $FeO_4^{2-}$ ion have been estimated in both acidic and basic media (R. H. Wood, J. Am. Chem. Soc., Vol. 80, p. 2038-2041 (1957)):

$$FeO_4^{2-} + 8H^+ + 3e^- \longrightarrow Fe^{3+} + 4H_2O \quad E° = 2.20V$$

$$FeO_4^{2-} + 4H_2O + 3e^- \longrightarrow Fe^{3+} + 8OH^- \quad E° = 0.72V$$

Ferrate is a strong oxidant that can react with a variety of inorganic or organic reducing agents and substrates (R. L. Bartzatt, J. Carr, Trans. Met. Chem., Vol. 11 (11), pp. 414-416 (1986); T. J. Audette, J. Quail, and P. Smith, J. Tetr. Lett., Vol. 2, pp. 279-282 (1971); D. Darling, V. Kumari, and J. BeMiller, J. Tetr. Lett., Vol. 40, p. 4143 (1972); and R. K. Murmann and H. J. Goff, J. Am. Chem. Soc., Vol. 93, p. 6058-6065 (1971)). It can, therefore, act as a selective oxidant for synthetic organic studies and is capable of oxidizing/removing a variety of organic and inorganic compounds from, and of destroying many contaminants in, aqueous and non-aqueous media.

In the absence of a more suitable reductant, ferrate will react with water to form ferric ion and molecular oxygen according to the following equation (J. Gump, W. Wagner, and E. Hart, Anal. Chem., Vol. 24., p. 1497-1498 (1952)).

$$4FeO_4^{2-} + 10H_2O \longrightarrow 4Fe^{3+} + 20OH^- + 3O_2$$

This reaction is of particular interest to water treatment because it provides a suitable mechanism for self-removal of ferrate from solution. In all oxidation reactions, the final iron product is the non-toxic ferric ion which forms hydroxide oligomers. Eventually flocculation and settling occur which remove suspended particulate matter.

The use of ferrate may therefore provide a safe, convenient, versatile and cost effective alternative to current approaches for water, wastewater, and sludge treatment. In this regard, ferrate is an environmentally friendly oxidant that represents a viable substitute for other oxidants, particularly chromate and chlorine, which are of environmental concern. Ferric oxide, typically known as rust, is the iron product of oxidation by ferrate. Therefore, ferrate has the distinction of being an "environmentally safe" oxidant. Although the oxidation reactions with ferrate appear similar to those known for $MnO_4^-$ and $CrO_4^{2-}$, ferrate exhibits greater functional group selectivity with higher rate of reactivity in its oxidations and generally reacts to produce a cleaner reaction product.

One problem hindering ferrate implementation is difficulty in its preparation. This difficulty may lead to increased production costs. Moreover, in addition to cost, the current methods known for producing a commercially useful and effective ferrate product, and the results of these methods, have been less than satisfactory. There exists a need for new synthetic preparative procedures that are easier and less expensive in order to provide ferrate material at economically competitive prices.

Three approaches for ferrate synthesis are known: electrolysis, oxidation of $Fe_2O_3$ in an alkaline melt, or oxidation of Fe(III) in a concentrated alkaline solution with a strong oxidant.

In the laboratory, by means of hypochlorite oxidation of iron (Fe(III)) in strongly alkaline (NaOH) solution, the ferrate product has been precipitated by the addition of saturated KOH (G. Thompson, L. Ockerman, and J. Schreyer, J. Am. Chem. Soc., Vol. 73, pp. 1379-81 (1951)):

$$2Fe^{3+} + 3OCl^- + 10OH^- \longrightarrow 2FeO_4^{2-} + 3Cl^- + 5H_2O$$

The resulting purple solid is stable indefinitely when kept dry.

Commercial production of ferrate typically uses a synthetic scheme similar to the laboratory preparation, also involving a hypochlorite reaction. Most commonly, using alkaline oxidation of Fe(III), potassium ferrate ($K_2FeO_4$) is prepared via gaseous chlorine oxidation in caustic soda of ferric hydroxide, involving a hypochlorite intermediate. Another method for ferrate production was described by Johnson in U.S. Pat. No. 5,746,994.

A number of difficulties are associated with the production of ferrate using the method described above. For example, several requirements for reagent purity must be ensured for maximized ferrate yield and purity. However, even with these requirements satisfied, the purity of the potassium ferrate product still varies widely and depends upon many factors, such as reaction time, temperature, purity of reagents, and isolation process. Ferrate prepared this way generally contains impurities, with the major contaminants being alkali metal hydroxides and chlorides and ferric oxide. However, samples of this degree of purity are unstable and readily decompose completely into ferric oxides.

Other than the specific problems with product impurities and instability, there also exist mechanical problems associated with the isolation of the solid ferrate product, such as filtering cold lye solutions having a syrupy consistency.

Other processes for preparation of ferrates are known and used, many of them also involving the reactions with hypochlorite. For example, U.S. Pat. No. 5,202,108 to Deininger discloses a process for making stable, high-purity ferrate (VI) using beta-ferric oxide (beta-Fe$_2$O$_3$) and preferably monohydrated beta-ferric oxide (beta-Fe$_2$O$_3$.H$_2$O), where the unused product stream can be recycled to the ferrate reactor for production of additional ferrate.

U.S. Pat. Nos. 4,385,045 and 4,551,326 to Thompson disclose a method for direct preparation of an alkali metal or alkaline earth metal ferrates from inexpensive, readily available starting materials, where the iron in the product has a valence of +4 or +6. The method involves reacting iron oxide with an alkali metal oxide or peroxide in an oxygen free atmosphere or by reacting elemental iron with an alkali metal peroxide in an oxygen free atmosphere.

U.S. Pat. No. 4,405,573 to Deininger et al. discloses a process for making potassium ferrate in large-scale quantities (designed to be a commercial process) by reacting potassium hydroxide, chlorine, and a ferric salt in the presence of a ferrate stabilizing compound.

U.S. Pat. No. 4,500,499 to Kaczur et al. discloses a method for obtaining highly purified alkali metal or alkaline earth metal ferrate salts from a crude ferrate reaction mixture, using both batch and continuous modes of operation.

U.S. Pat. No. 4,304,760 to Mein et al. discloses a method for selectively removing potassium hydroxide from crystallized potassium ferrate by washing it with an aqueous solution of a potassium salt (preferably a phosphate salt to promote the stability of the ferrate in the solid phase as well as in aqueous solution) and an inorganic acid at an alkaline pH.

U.S. Pat. No. 2,758,090 to Mills et al. discloses a method of making ferrate, involving a reaction with hypochlorite, as well as a method of stabilizing the ferrate product so that it can be used as an oxidizing agent.

U.S. Pat. No. 2,835,553 to Harrison et al. discloses a method, using a heating step, where novel alkali metal ferrates with a valence of +4 are prepared by reacting the ferrate (III) of an alkali metal with the oxide (or peroxide) of the same, or a different, alkali metal to yield the corresponding ferrate (IV).

U.S. Pat. No. 5,284,642 to Evrard et al. discloses the preparation of alkali or alkaline earth metal ferrates that are stable and industrially usable as oxidizers, and the use of these ferrates for water treatment by oxidation. Sulfate stabilization is also disclosed.

The development of an economical source of ferrate is desired to derive the benefits associated with ferrate application in a wide range of processes. In view of the difficulties associated with the previously known methods for preparing ferrates and the problems inherent in the ferrate produced by these known methods, there is therefore an existing need for a new preparative method for ferrate that is easy, convenient, safe and inexpensive, and that avoids both the chemical and mechanical problems. There also exists a need for a system which reduces or counteracts the limited stability of ferrate, and systems which employ ferrate as an environmentally friendly oxidant and disinfectant.

SUMMARY OF THE INVENTION

A method of continuously synthesizing ferrate is disclosed, comprising mixing a mixture comprising an iron salt and an oxidizing agent in a mixing chamber; delivering at least a portion of the mixture to a reaction chamber; continuously generating ferrate in the reaction chamber; delivering at least a portion of the ferrate to a site of use that is proximal to the reaction chamber; and adding additional iron salt and oxidizing agent to the mixing chamber.

Also disclosed is a method of treating, at a site of use, a mixture having at least one impurity, comprising continuously generating ferrate in a reaction chamber located proximal to the site of use; contacting the ferrate with the mixture at the site of use, whereby at least a portion of the impurity is oxidized.

Also disclosed is a device for continuously synthesizing ferrate, comprising a first holding chamber; a second holding chamber; a mixing chamber controllably connected to the first holding chamber and to the second holding chamber, into which a content of the first holding chamber and a content of a second holding chamber are added to form a mixture; a reaction chamber controllably connected to the mixing chamber, into which the mixture is kept for a period of time; and an output opening in the reaction chamber through which the mixture may be transported to a proximal site of use.

Also disclosed is a system for continuously synthesizing ferrate, comprising a first holding chamber containing an iron salt; a second holding chamber containing an oxidizing agent; a mixing chamber controllably connected to the first holding chamber and to the second holding chamber, into which the iron salt and the oxidizing agent are controllably added to form a mixture; a reaction chamber controllably connected to the mixing chamber, into which the mixture is kept for a period of time, and in which ferrate is synthesized, and an output opening in the reaction chamber through which the ferrate may be transported to a proximal site of use. The "period of time" during which the mixture is kept in the reaction chamber may range from seconds to hours to days, but may be any time longer than zero seconds.

Also disclosed is a method of continuously synthesizing ferrate, comprising providing a mixture of an iron salt and an oxidizing agent; continuously delivering at least a portion of the mixture to a heating chamber; exposing the mixture to elevated temperatures in the heating chamber, thereby generating ferrate; removing at least a portion of the generated ferrate from the heating chamber; adding additional mixture to the heating chamber.

Also disclosed is a device for continuously synthesizing ferrate, comprising a holding chamber; a mover controllably connected to the holding chamber such that at least a portion of a content of the holding chamber is transferred to the mover; a heating chamber, through which at least a portion of the mover moves; an output opening in the heating chamber through which the content on the mover may be transported to a proximal site of use.

Also disclosed is a device for continuously synthesizing ferrate, comprising a mixing chamber comprising two electrodes, where the electrodes provide sufficient electric current to convert a solution of an iron salt to a solution of ferrate; a reaction chamber controllably connected to the mixing chamber, into which the mixture is kept for a period of time; and an output opening in the reaction chamber through which the mixture may be transported to a proximal site of use. The mixture is kept in the reaction chamber for a period of time longer than zero seconds.

Also disclosed is a method of continuously synthesizing ferrate, comprising continuously providing an aqueous solution comprising an iron salt in a mixing chamber, where the mixing chamber comprises at least two electrodes; providing sufficient electric current to the at least two electrodes to convert at least a portion of the iron salt to ferrate; delivering at least a portion of the ferrate to a site of use that is proximal to the reaction chamber; and adding additional aqueous solution to the mixing chamber.

Also disclosed is a method of synthesizing ferrate, comprising mixing a mixture comprising an iron salt and an oxidizing agent in a mixing chamber; delivering at least a portion of the ferrate to a site of use that is proximal to the mixing chamber.

BRIEF DESCRIPTION OF THE DRAWINGS

FIG. 1 depicts an embodiment of the device for solution phase synthesis of ferrate ion.

DETAILED DESCRIPTION OF THE PREFERRED EMBODIMENT

Figure 2:
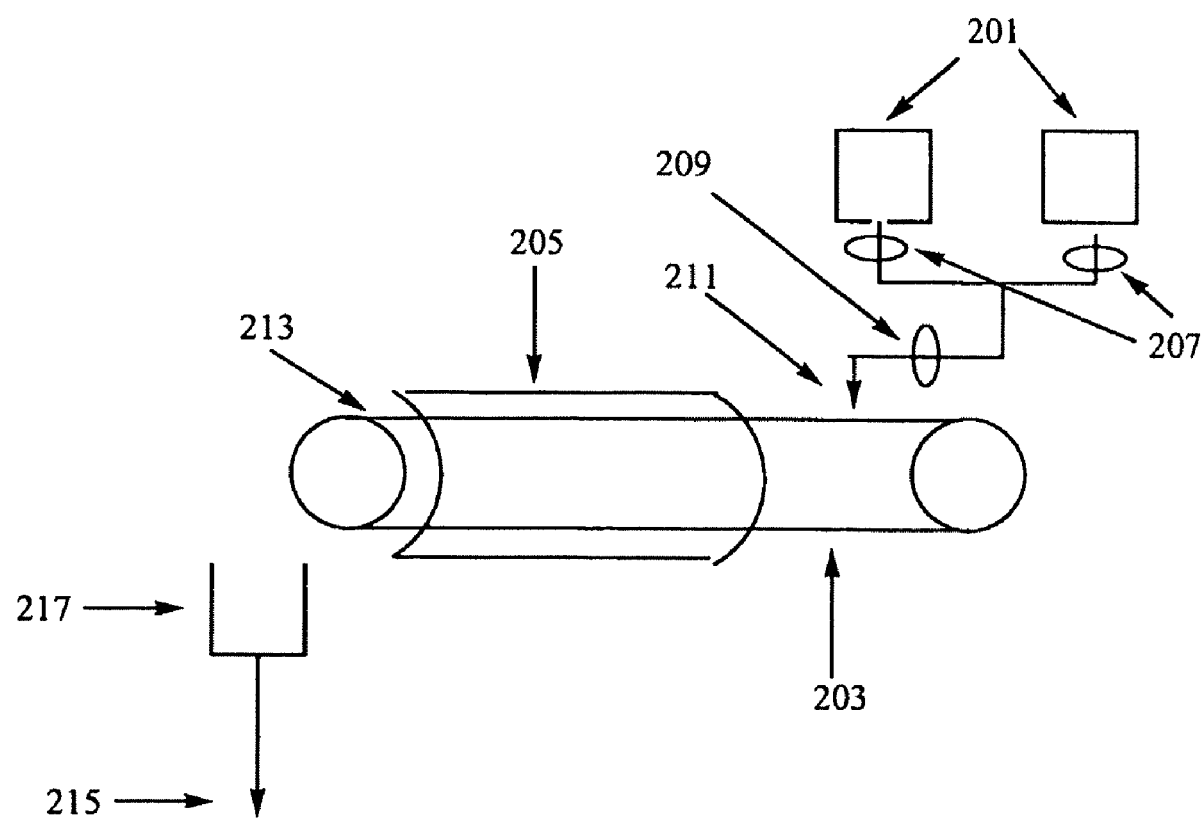
FIG. 2 depicts an embodiment of the device for solid phase synthesis of ferrate ion.

It is an object of the invention to provide a new, convenient, inexpensive, and safe method for producing a salt of ferrate. Such a method may produce the sodium salt, but may be used to prepare other salts of Group I or Group II cations, or other cations, whether metallic or not.

It is an object of the invention to provide an environmentally friendly oxidant for application in a variety of wastewater contaminants and water treatment problems. Such an oxidant produces a cleaner reaction product(s) and thereby may be used to replace existing environmental, laboratory, and industrial oxidants which may have deleterious side effects or costs.

It is an object of the invention to provide a new, safe, and inexpensive industrial and environmental remediation chemical oxidant that overcomes the problems associated with known oxidants for water treatment (for example, chlorine, hypochlorite, chlorine dioxide, permanganate, and ozone) and the by-products of these oxidants.

It is an object of this invention to provide a new ferrate product to be used in the control of sulfides, including hydrogen sulfide gas, in sewer systems, ground water, treatment plants, and waste treatment facilities.

It is an object of the invention to provide an improved ferrate product for remediation of uranium, transuranics, rocket fuel propellant contaminants (hydrazine and monomethylhydrazines) and mustard gas.

It is a further object of the invention to provide an innovative product to be used as coagulant and disinfectant.

It is an object of the present invention to provide an oxidant to be used in drinking water disinfection and coagulation, biofouling control, ground water decontamination, solid surface washing, and hazardous waste treatment.

It is an object of the present invention to provide an oxidant to be used in synthetic chemistry.

It is an object of the present invention to provide an oxidant to be used in surface preparation, including polymer surface and metallic surface preparation.

To achieve at least one of the above-stated objectives, the following methods, manufactures, compositions of matter, and uses thereof are provided.

I. On-Site Generation

The inventors have discovered that many of the presently unaddressed problems associated with ferrate use relate to the purification and storage of ferrate. Therefore, in some embodiments of the invention, a system of producing ferrate and using it without substantially further purification, packaging, or preparation is provided. Because ferrate, in its unpurified form decomposes rather rapidly, the ferrate produced by the provided methods need not be stored. Ferrate may, and preferably is, used immediately, or substantially soon after its generation. Therefore, certain embodiments of the present invention provide a device that is designed to be located in close proximity to the site of use, such that when ferrate is produced, it may be rapidly and efficiently delivered to the site of use, without substantial further purification, packaging, shipping, transfer, or preparation.

As used herein, the terms "site of generation" or "generation site" refer to the site where the device for the generation of ferrate is located. In one embodiment exemplified herein, the generation site includes a reaction chamber for generation of ferrate. The terms "site of use," "use site," or "treatment site" refer to the site where the ferrate is contacted with the object it is to oxidize, synthesize, disinfect, clean, plate, encapsulate, or coagulate.

The terms "close proximity" and "proximal" are used interchangeably herein. These terms are used to refer to the relative locations of the generation site and the use site when the two sites are within a distance that allows for the ferrate to travel the distance within a half-life of its decomposition. "Half-life" of a decomposition is understood to be the amount of time it takes for one half of the material present to undergo decomposition. The half-life for any given ferrate composition will depend on the conditions under which the ferrate is generated and/or stored. Thus, for example, the temperature, concentration of base, concentration of oxidizing agent and presence of impurities will all tend to affect the half-life of the ferrate composition. However, the half-life can be readily measured by those having ordinary skill in the art using conventional techniques. Therefore, a generation site is "proximal" to a use site when the concentration of ferrate at the use site at the time of delivery is equal to or greater than one-half of the concentration of ferrate at the generation site. The distance between the generation site and the use site is defined in terms of the half-life and a length of time required for delivery, rather than simply in terms of physical displacement. Thus, the physical displacement between a generation site and use site that are in close proximity may vary depending on the half-life of the ferrate composition being delivered between the two sites and the rate at which the composition is delivered. Accordingly factors affecting both the rate of ferrate transfer and factors affecting the half-life will all affect the maximum physical displacement permissible for the two sites to remain in close proximity. Factors affecting the rate of ferrate transfer include, but are not limited to, the pressure generated by a pump used in the transfer and the size of the plumbing used in the transfer.

The on-site generation methods provide a number of advantages over known processes. Initially, because the produced ferrate can be used without further substantial purification or stabilization, there is no need for storage or shipping. In addition, eliminating the need for a highly purified ferrate ultimately saves costs by increasing the yield of the reaction because less starting materials are needed to afford the same amount of usable ferrate.

The current practice for making and purifying ferrate involves the production of sodium ferrate using sodium hydroxide, followed by the precipitation of potassium ferrate using potassium hydroxide. Thus, the current methods use base in two distinct steps. The methods of some of the embodiments of the present invention require substantially less base to produce usable ferrate since the methods do not require the addition of potassium hydroxide to sodium ferrate.

Thus, the ferrate produced by some of the methods of the present invention can be used or purified in a solution-to-solution phase manner, i.e., ferrate is generated in the solution phase and is used in the solution phase, without the intervening crystallization, or conversion to the solid phase (i.e., solution-to-solid phase). If partial purification or separation is required, then such purification or separation can be achieved in the solution phase as well. In certain embodiments of the present invention, the produced ferrate is not converted to any phase other than the solution phase.

The solution-to-solution phase concept discussed above provides advantages over the solution-to-solid phase method. For example, as discussed above, conversion to solid or crystallization is limited by the nature of the counter-ion. Crystallization of potassium ferrate is less difficult than crystallization of sodium ferrate. Ferrate with certain counter-ions can never be crystallized or can be crystallized under very difficult conditions. Using the solution-to-solution phase concept, virtually any counter-ion can be used. In addition, once ferrate is crystallized, it would have to be re-dissolved in aqueous media for use. The re-dissolution of ferrate adds both cost (loss of ferrate, addition of water, and dissolution tanks, to name a few) and time (dissolution time) to the process. In the solution-to-solution phase method, ferrate is already in aqueous solution and can be used as such. Furthermore, if pH is to be adjusted, it is more efficient to adjust the pH of the ferrate stream once it is produced than to adjust the pH of a ferrate solution prepared from adding solid ferrate to water. Yet another advantage of the solution-to-solution phase concept is the ease of production of custom blends.

The above advantages result in the entire process being cheaper and more economical than the available processes. The relatively low cost of production allows the ferrate to be used in a large variety of settings, which heretofore have been substantially unavailable for the oxidizing benefits of the compound due to its cost. Most importantly, ferrate may now be made available to municipal water and wastewater treatment facilities, which are cost conscious.

Furthermore, on-site generation of ferrate allows the end user to control the amount of ferrate to be produced. This may alleviate or reduce the need for inventory control of ferrate, in addition to alleviating or reducing the need to store ferrate.

II. Process for Preparing Ferrate

A. Solution Phase Production

In one aspect, the invention relates to a method of continuously synthesizing ferrate, comprising mixing an iron salt and an oxidizing agent in a mixing chamber to form a mixture; delivering at least a portion of the mixture to a reaction chamber; continuously generating ferrate in the reaction chamber; delivering at least a portion of the ferrate to a site of use that is proximal to the reaction chamber; and adding additional iron salt and oxidizing agent to the mixing chamber.

In certain embodiments, the above method further comprises the addition of a solvent during the mixing step. In some embodiments, the solvent is water and the mixture is, therefore, an aqueous solution. In other embodiments, the mixture is a non-aqueous solution. In certain other embodiments, the oxidizing agent may be a neat liquid, in which case it would act as a solvent for dissolving the iron salt as well. In still other embodiments, the iron salt and the oxidizing agent are added as solids, and the reaction takes place in solid form.

Thus, one embodiment of the invention relates to a method of continuously synthesizing ferrate, comprising mixing an aqueous solution comprising an iron salt and an oxidizing agent in a mixing chamber; delivering at least a portion of the aqueous solution to a reaction chamber; continuously generating ferrate in the reaction chamber; delivering at least a portion of the ferrate to a site of use that is proximal to the reaction chamber; and adding additional aqueous solution to the mixing chamber.

It is known to those of skill in the art that iron can accommodate an oxidation state in the range of 0 to +8, including the +1, +2, +3, +4, +5, +6, and +7 oxidation states. Iron in the 0 oxidation state is elemental iron. Most compounds and salts of iron found in nature have an oxidation state of either +2 (Fe(II)) or +3 (Fe(III)). In the context of the present invention, "ferrate" refers to an ion comprising iron in its +4, +5, +6, +7, or +8 oxidation states, i.e., comprising Fe(IV), Fe(V), Fe(VI), Fe(VII), or Fe(VIII). The ferrate ion also contains oxygen atoms. It may or may not comprise atoms of other elements. Furthermore, "ferrate" may also refer to a mixture of ions comprising iron in various oxidation states, as long as at least a portion of the ions comprise iron exhibiting an oxidation state of +4 or higher. Thus, for example, ferrate refers to a $FeO_4^{2-}$, where the iron is Fe(VI) and the other atoms in the ion are oxygen atoms. A solution comprising $FeO_4^{2-}$ ions may also contain ions exhibiting iron in its +5 oxidation state, or any other oxidation state, including the elemental form of iron, and it would still be called ferrate. Similarly, a ferrate solution may contain no Fe(VI) containing ions. A ferrate solution may also comprise Fe(V) or Fe(IV) containing ions. Therefore, any ion comprising Fe(IV), or higher oxidation state iron atoms, and at least one oxygen atom is considered to be "ferrate." Ferrate ions may be either cations or anions.

It is understood by those skilled in the art that any ion requires a counterion of equal, though opposite, charge. This is also true for the ferrate ions of the present invention. The counterion may be any ion that renders neutral the overall charge of the mixture comprising the ferrate ion. When ferrate is an anion, the counterion may be any cation. The most common form of ferrate to-date is $K_2FeO_4$, where the iron is in its +6 oxidation state, the ferrate is an anion and the counterion is potassium. Any other counter-cation, such as, and without limitation, sodium, calcium, magnesium, silver, etc., may also be present.

By "continuously generating" or "continuously synthesizing" it is meant that once ferrate begins to be delivered to the reaction chamber, there continues to be an amount of ferrate in the reaction chamber for the duration of time that the method is being practiced. Thus, as described hereinbelow in greater detail, in one embodiment of a continuous generation process in accordance with the present invention, there is a constant flow of material from the mixing chamber to the reaction chamber. In other embodiments, as also described hereinbelow, material is intermittently transferred from the mixing chamber to the reaction chamber while maintaining at least some ferrate in the reaction chamber.

In certain embodiments, the additional mixture of iron salt and oxidizing agent of the above method is added in an amount to substantially replace the portion of the mixture delivered to the reaction chamber. In the context of the present invention, for a second amount to substantially replace a first amount, the second amount may be less than, equal to, or greater than the first amount.

In certain embodiments, the method of producing ferrate further comprises adding a base to the mixture. The base may comprise a nitrogen base or an ion selected from the group consisting of hydroxide, oxide, sulfonate, sulfate, sulfite, hydrosulfide, phosphate, acetate, bicarbonate, and carbonate, or a combination thereof. "Nitrogen bases" are selected from acyclic and cyclic amines. Examples of nitrogen bases include, but are not limited to, ammonia, amide, methylamine, methylamide, trimethylamine, trimethylamide, triethylamine, triethylamide, aniline, pyrrolidine, piperidine, and pyridine, or salts thereof.

To produce ferrate by the methods of the present invention, an iron salt must be provided. "Iron salt" or "salt of iron" refers to a compound that comprises an iron atom in an oxidation state other than zero. The iron salt used by the methods of the present invention may be produced in situ, i.e., by oxidizing elemental iron either chemically or electrochemically prior to its introduction into the mixing chamber or by performing the oxidation inside the mixing chamber. The iron atom in the iron salt will have an oxidation state greater than zero, preferably +2 or +3, though this oxidation state may be reached transiently as the iron atom is converted from its starting oxidation state to the final oxidation state of +4 or above.

In certain embodiments, the iron salt may be selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxides, ferrous oxides, ferric hydrogen carbonate, ferrous hydrogen carbonate, ferric carbonate, and ferrous carbonate, or a combination thereof. All different forms of ferric and ferrous oxide are contemplated to be used with the methods of the present invention.

In some embodiments of the present invention, ferrate is produced by chemical oxidation of the iron salt. The chemical oxidation is performed by mixing an oxidizing agent, or a solution containing the oxidizing agent, with the iron salt, or with the solution containing the iron salt. In some embodiments, the oxidizing agent, or a solution containing the oxidizing agent, is added to the iron salt, or to the solution containing the iron salt, whereas in other embodiments, the iron salt, or the solution containing the iron salt, is added to the oxidizing agent, or to a solution containing the oxidizing agent. An "oxidizing agent" is a chemical compound that oxidizes another compound, and itself is reduced. In certain embodiments, the oxidizing agent comprises at least one of the following: a hypohalite ion, a halite ion, a halate ion, a perhalate ion, ozone, oxone, halogen, a peroxide, a superoxide, a peracid, a salt of a peracid, and Caro's acid, or a combination thereof.

Embodiments of the invention include those in which the oxidizing agent comprises a hypohalite ion selected from the group consisting of the hypochlorite ion, the hypobromite ion, and the hypoiodite ion. In other embodiments of the invention, the oxidizing agent comprises a halite ion selected from the group consisting of the chlorite ion, the bromite ion, and the iodite ion. In yet other embodiments of the invention, the oxidizing agent comprises a halate ion selected from the group consisting of the chlorate ion, the bromate ion, and the iodate ion. Certain other embodiments of the invention include those in which the oxidizing agent comprises a perhalate ion selected from the group consisting of the perchlorate ion, the perbromate ion, and the periodate ion.

Thus, in an embodiment of the present invention, an aqueous solution of an iron salt and an oxidizing agent is mixed in a mixing chamber. A base, or a combination of bases, may also be added to the mixing chamber at this time. The solution is mixed in the mixing chamber for a certain period of time, which may range from seconds to hours depending on the conditions of the mixing, e.g., the temperature or the concentration of the ingredients. Those skilled in the art recognize that at this stage ferrate production begins.

As the mixing is taking place, at least a portion of the mixture is delivered to a reaction chamber. The mixture is held in the reaction chamber for a certain period of time until the amount of ferrate in the mixture, e.g., the concentration of ferrate in an aqueous solution, reaches a predetermined level. The concentration of ferrate for use is determined based on the need for the ferrate and the conditions for the synthesis or use. Certain applications may require higher yields of ferrate than others. Therefore, the time that mixture remains in the reaction chamber may range from seconds to hours. The reaction chamber may also be used as a "holding tank," i.e., a place to keep the generated ferrate, at a certain temperature, to be used at a later time. The holding tank may be at room temperature, or at a temperature that is either higher or lower than room temperature. The mixture containing the ferrate is then removed from the reaction chamber and is delivered to the site of use. The site of use is "proximal" to the reaction chamber.

In certain embodiments, as the mixture is removed from the mixing chamber to the reaction chamber, additional iron salt and oxidizing agent is added to the mixing chamber. In other embodiments, additional iron salt and oxidizing agent is added to the mixing chamber after all of the mixture within the mixing chamber has been transferred to the reaction chamber. It is contemplated in some of the embodiments of the present invention that the flow of the mixture from the mixing chamber to the reaction chamber is continuous. Therefore, while ferrate is needed, new batches of the mixture are to be added to the mixing chamber.

In some of the embodiments of the present invention, in addition to the iron salt, a metal oxide is added to the mixture. The metal oxide may be added at any point during the production of ferrate, either as an original ingredient, or in the mixing chamber, or in the reaction chamber, or anywhere along the path. The metal oxide may also be added to a mixture comprising ferrate subsequent to the production of ferrate, when ferrate is being contacted, or after ferrate has been contacted, with the object to be synthesized, cleaned, disinfected, oxidized, or coagulated. The metal atom of the metal oxide may be a main group metal, a transition metal, or an f-block metal. A "transition metal" is a metal within columns 3-12 of the periodic table, i.e., metals in the scandium, titanium, vanadium, chromium, manganese, iron, cobalt, nickel, copper, and zinc triads. An "f-block metal" is a metal in the lanthanide or actinide series, i.e., metals with atomic numbers 57-71 and 89-103. Thus, lanthanum and actinium are both transition metals and f-block metals. The metal oxide may be scandium oxide, titanium oxide, vanadium oxide, manganese oxide, cobalt oxide, nickel oxide, copper oxide, zinc oxide, gallium oxide, yttrium oxide, zirconium oxide, niobium oxide, molybdenum oxide, ruthenium oxide, rhodium oxide, palladium oxide, silver oxide, cadmium oxide, indium oxide, tin oxide, hafnium oxide, tantalum oxide, tungsten oxide, rhenium oxide, osmium oxide, iridium oxide, platinum oxide, or any salt containing the oxides of these metals.

In certain embodiments, the solution comprising ferrate is irradiated with light before or during use. In other embodiments, the solution comprising ferrate is kept in the dark before use. When the solution is irradiated with light, the light may be a light of any frequency within the electromagnetic spectrum, i.e., anywhere between radio waves and x-rays and gamma radiation, including ultraviolet light, visible light, or infrared light.

Certain other embodiments of the present invention are directed to a "batch process," during which ferrate is generated once. Thus, these embodiments of the present invention are directed to a method of synthesizing ferrate, comprising adding an aqueous solution comprising an iron salt and an oxidizing agent in a mixing chamber; mixing the aqueous solution; delivering at least a portion of the aqueous solution to a reaction chamber; and delivering at least a portion of the ferrate to a site of use that is proximal to the reaction chamber.

In certain embodiments, the ferrate generated by the above method in the mixing chamber is delivered to the site of use without being delivered to a separate reaction chamber. In these embodiments, therefore, the mixing chamber and the reaction chamber are one and the same. In certain other embodiments, after the mixing in the mixing chamber, the ferrate solution is delivered to a holding tank where it is kept until its use is needed. In any event, the ferrate solution is held for a period of time that is less than or equal to the half-life of the ferrate in the solution under the conditions (i.e., temperature, concentration, pH, etc.) it is held.

B. Solid State Production

In another aspect, the invention relates to a method of continuously synthesizing ferrate, comprising providing a mixture of an iron salt and an oxidizing agent; continuously delivering at least a portion of the mixture to a heating chamber; exposing the mixture to elevated temperatures in the heating chamber, thereby generating ferrate; removing at least a portion of the generated ferrate from the heating chamber; adding additional mixture to the heating chamber.

In certain embodiments, the exposure of the mixture to elevated temperatures and the removal of ferrate from the exposure is continuous.

In some embodiments, the additional mixture added to the heating chamber is in an amount to substantially replace the portion of the ferrate removed from the heating chamber.

By "continuously delivering" it is meant that once the mixture of iron salt and oxidizing agent begins to be delivered to the heating chamber, it continues to be delivered to the heating chamber for the duration of time that the method is being practiced.

In certain embodiments of the invention, a base, as described herein, is also added to the mixture.

In some of the embodiments of the present invention, the mixture of the iron salt and the oxidizing agent is carried through the heating chamber on a belt. The belt is made of materials that can withstand temperatures higher than room temperature. These materials may include, but not be limited to, rubber, steel, aluminum, glass, porcelain, etc.

In certain embodiments of the invention the mixture is poured directly onto the belt, whereas in other embodiments, the mixture is poured into containers and the containers are placed on the belt. In any of these embodiments, the surface that comes to contact with the mixture is not reactive towards ferrate or other oxidants.

The heating chamber is heated to temperatures higher than room temperature. "Room temperature" is about 20° C. In some embodiments the heating chamber is heated to a temperature of between about 20° C. and about 1000° C., or between about 50° C. to about 500° C., or between about 100° C. to about 400° C. By "about" a certain temperature it is meant that the temperature range is within 40° C. of the listed temperature, or within 30° C. of the listed temperature, or within 20° C. of the listed temperature, or within 10° C. of the listed temperature, or within 5° C. of the listed temperature, or within 2° C. of the listed temperature. Therefore, by way of example only, by "about 400° C." it is meant that the temperature range is 400±40° C. in some embodiments, 400±30° C. in some embodiments, 400±20° C. in some embodiments, 400±10° C. in some embodiments, or 400±5° C. in other embodiments, or 400±2° C. in still other embodiments. In some embodiments the temperature remains relatively constant throughout the process whereas in other embodiments the temperature varies during the process. In the embodiments where the temperature varies, the temperature may be ramped up, i.e., the final temperature is higher than the initial temperature, or ramped down, i.e., the final temperature is lower than the initial temperature.

Thus, in some embodiments of the present invention, a mixture of an iron salt and an oxidizing agent is put on a belt. The iron salt and the oxidizing agent may be pre-mixed prior to addition to the belt, or they may be mixed subsequent to addition to the belt. The mixture may be added directly onto the belt or may be added to containers that are placed on the belt. The mixture may be added to the containers before the containers are put on the belt or the mixture may be added to the containers while the containers are on the belt. In certain embodiments, base is also added to the mixture at some point.

The belt then moves through a heating chamber, thereby heating the mixture. The heat must be sufficient to produce ferrate in the mixture. The speed of the belt through the heating chamber, the length of time the mixture is heated, and the temperature to which the mixture is heated are all adjustable. Thus, the mixture may be heated for seconds or for hours.

Subsequent to the heating event, the heated mixture, now comprising ferrate, is removed from the belt. The belt then returns to the original location for the addition of more of the mixture. It is contemplated that the movement of the belt through the heating chamber is continuous.

In some embodiments, the mixture exposed to elevated temperature in the above method is a solid.

C. Electrochemical Production

In another aspect, the invention relates to a method of continuously synthesizing ferrate, comprising providing an aqueous solution comprising an iron salt in a reaction chamber, where the reaction chamber comprises at least two electrodes; providing sufficient electric current to the at least two electrodes to convert at least a portion of the iron salt to ferrate; continuously delivering at least a portion of the ferrate to a site of use that is proximal to the reaction chamber; and adding additional aqueous solution to the reaction chamber to substantially replace the portion of the aqueous solution delivered to the holding chamber.

By "continuously delivering" it is meant that once ferrate begins to be delivered to the site of use, it continues to be delivered to the site of use for the duration of time that the method is being practiced.

In certain embodiments of the invention, base is added to the aqueous solution, while in other embodiments, acid is added.

The reaction chamber comprises two electrodes. The electrodes are designed to conduct electricity through the aqueous solution, thereby converting the iron of the iron salt to ferrate in an electrochemical reaction. The iron of the iron salt may have been added to the solution as an iron salt, or may be the dissolved iron electrode, which became dissolved upon the introduction of electricity. It is contemplated that as solution containing ferrate is removed from the reaction chamber, additional aqueous solution is added to the mixing chamber for additional reactions. In certain embodiments, the flow of materials from the reaction chamber to the holding chamber is continuous.

D. Other Examples of Methods of Ferrate Production

In one embodiment, ferric sulfate particles may be added to a static mixer and mixed in an aqueous medium. The static mixer includes a mixing mechanism that is capable of microparticulating particles. Static mixers may be continuous radial mixing devices, characterized by plug flow or any other conventional mixer. Static mixers are preferred in that they have short residence times and little back mixing. Thus, proper dosing of feed components with no fluctuation in time is a prerequisite for good performance.

Another desirable feature of static mixers is that they have no moving parts for mixing. The absence of moving parts and reliance on surface area and conformation for reactant/product movement reduces the need for coolant to cool the reaction. Thus, static mixers are comparatively low maintenance pieces of equipment. The static mixers used in the processes of the present invention may be incorporated into pump-around loop reactors or in cascade type reactors, such as those manufactured by Koch, i.e., The Koch-SMVP packing /Rog 92/. Other static mixers include Koch type SMF, SMXL-R, SMXL, SMX and SMV type.

For other embodiments, a micro reactor is used for mixing reactants. Micro-reactors and static mixers are usable to make ferrate in a continuous process or a semi-continuous process.

The mixing mechanism may be a tortuous path, a mixing device or an aspirator. Oxone or Caro's Acid or other strong oxidant in container is added to the static mixer. The term "oxone" as used herein refers to potassium peroxymonopersulfate or potassium monopersulfate. Reaction begins instantaneously and generates heat. The temperature of the reaction is adjusted through the use of a cooling coil or cooling jacket to a temperature of about −10° C. Temperature is controlled through a feed forward feed back control mechanism. Water is employed as a transport medium for transporting the ferric sulfate, oxidant and reaction products. The volume of the water is minimized to a volume that maximizes ferrate production yield.

An amount of dry KOH may be added that is effective to maximize ferrate production. The KOH is added to another micro mixer or static mixer KOH is added to a main reactor. The KOH is cooled to about −10° C. prior to introduction to the main reactor. The main reactor is also a static mixer.

An excess of KOH prevents conversion of Fe(III) to ferrate. The use of static mixers maximize surface area available for reaction for all of the reactants. It is believed that the use of a static mixer or micro mixer speeds up the reaction process.

A use of Caro's acid is preferred in that it aids in stabilizing ferrate because sulfate from the Caro's acid "buffers" the ferrate. It is understood, however, that if the static mixer is positioned proximal to water or wastewater to be treated, sulfate stabilization is optional and Fe(0) oxidation can occur with another oxidant, such as chlorine or peroxide.

The temperature in the reactor is preferably maintained at about 40° C., but may be as low as 20° C. or as high as 60° C. As products are removed from the reactor, the temperature in the product stream is gradually decreased to room temperature.

A use of a static mixer permits a method of water treatment that includes shocking an iron moiety with an oxidant, quenching the reaction with KOH and injecting the ferrate into a water or wastewater or sludge stream. The use of a static mixer renders a complex chemical reaction performable by operators of water and waster treatment plants. Because of the microparticulation of iron species and very rapid mixing, conventional concerns about temperature control are substantially eliminated.

In one other embodiment ferrate is produced in a continuous process by hypochlorite oxidation of iron (III) in a strongly alkaline solution and is precipitated by the addition of saturated KOH. Hypochlorite used in ferrate synthesis is formed by disproportionation of chlorine in a cold caustic soda solution:

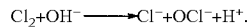
$$Cl_2 + OH^- \longrightarrow Cl^- + OCl^- + H^+.$$

Ferrate ion may be produced by adding a material such as ferric nitrate to the hypochlorite solution described:

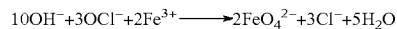
$$10OH^- + 3OCl^- + 2Fe^{3+} \longrightarrow 2FeO_4^{2-} + 3Cl^- + 5H_2O$$

Synthesis of ferrate begins by addition of KOH solutions to a cold-water jacketed reactor set between 20° C. and 40° C. Gaseous or liquid chlorine is bubbled through the liquid reaction mixture, and the solid iron salt or oxide is added. Atmospheric pressure is maintained in the reactor. The ranges of mole ratios of reactants, $Cl_2$, KOH, Fe(III), are 1.5-30:10-60:1. The smaller ratios decrease product yields, while the larger ratios require larger recycle streams back to the reactor, leave KOH unused, or accelerate ferrate decomposition.

The average residence time of the ferrate in the reactor is 180 minutes. Residence times greater than 30 minutes lead to significant ferrate decomposition. The product mixture leaving the reactor is typically 2-6% potassium ferrate by weight.

The reaction mixture includes solid $K_2FeO_4$, KCl, and $Fe(OH)_3$ and aqueous KOH, KOCl, KCl, and a small amount of $K_2FeO_4$. The KOH concentration in this mixture is increased to 35-45% by weight to further precipitate the ferrate from solution. The temperature is lowered during this process to 5-20° C. to maximize the yield of solid potassium ferrate. The crude solid product is separated by centrifugation within 5 minutes of finishing the KOH addition and the liquids are recycled back to the reactor.

The crude product is contaminated with KCl and $Fe(OH)_3$. Selectively dissolving the potassium ferrate into 10-20% KOH (aq), by weight, at 20-50° C., purifies the product. The KCl and $Fe(OH)_3$ are insoluble in this media and are removed by centrifugation. The solids may be separated and reprocessed for use as starting materials in ferrate production.

The ferrate ion may be reprecipitated by addition of concentration KOH solutions, 40-55% by weight, or solid KOH. When the resulting mixture is 30%, crystals of $K_2FeO_4$ precipitate when the solution is cooled to between −20 and 0° C. As in the earlier separation steps, the solid is collected by centrifugation. The separated KOH solutions may be recycled to the ferrate reactor.

The potassium ferrate produced may be washed in a tank with anhydrous DMSO to remove any entrapped KOH or water. The DMSO is recovered by flash evaporation. Next, the solid is transferred to a methanol wash tank for further purification. The solid is finally collected by centrifugation. The methanol is recovered by distillation.

In another embodiment reactants described above are added to a reactor cooled to a temperature of 20° C. After about 180 minutes, reaction products are treated with KOH, to solubilize any precipitated ferrate and the entire mixture is transferred to water or wastewater or sludge for treatment. For one embodiment, effluent from the reactor includes unreacted ferric sulfate, unreacted oxone, potassium sulfate, KOH and about 20% dissolved ferrate. The presence of KOH and ferric ions retard the decomposition rate with water as the product stream is being mixed with untreated water.

The mixture containing the ferrate may be polished, if required.

In another embodiment hypochlorite is substituted for chlorine gas. By introducing NaCl to the reaction mixture, $Na_2FeO_4$ is precipitated without any need for a KOH leaching step or extra equipment.

In another embodiment ferrate is generated as a solid in a fluidized bed reaction. The fluidized bed comprises one or more of $FeCl_2$, $FeSO_4$, $Fe_2(SO_4)_3$, $Fe(NO_3)_3$ and beta-ferric oxide monohydrate, oxygen gas and chlorine gas. The reaction occurs at a reduced temperature, such as 20° C. Crystals of ferrate are produced.

In one other embodiment ferrate is produced as a result of a direct reaction of alkali peroxides, such as sodium peroxide or potassium peroxide or potassium superoxide with hematite to produce potassium or sodium ferrate. The reaction is believed to proceed by these chemical reactions:

$$Fe_2O_3 + 6 KO_2 \longrightarrow 2 K_3FeO_4 + K_2O + 3 O_2(g)$$

$$Fe_2O_3 + 3 K_2FeO_4 + K_2O$$

Mole ratio
1 $Fe_2O_3$:6 $K_2O$
1 $Fe_2O_3$:3 $K_2O_2$
1 Fe:3 K, for
both

The temperature of reaction for this synthetic approach is about 400 to 600° C. for a time of about 12 hours. It is believed that chemical reaction occurs though a solid-solid contact, a liquid-solid contact or a vapor/solid contact. The liquid is a molten salt. The vapor is a material such as $K_2O_2$ vapor.

Reactants should be dry, of fine particle size and well mixed. Mixing should avoid contact with air, as moisture and $CO_2$ will react with peroxide. Reactants should be held at 120 to 150° C. in a TGA in dry nitrogen to thoroughly remove any adsorbed water prior to heating to the TGA reaction temperature.

When dissolved peroxide/superoxide reacts with hematite, it produces ferrate, dissolved in a salt solution. Upon cooling, the dissolved ferrate ions precipitate from the salt as crystals of $K_2FeO_4$. A high temperature route produces $K_2FeO_4$, but with modest yields and with a requirement of a subsequent processing step to separate the $K_2FeO_4$ from the salt mixture. In one embodiment, the salt mixture is not separated and the entire mixture is used for water or wastewater treatment. One advantage is that a simple process involving a single high temperature reactor translates into a lower cost of production.

One other option is a two-step process. An inexpensive source of peroxide/superoxide is processed in a first reactor to produce a gas stream containing peroxide/super oxide species. The gas stream is ducted into a second reactor containing hematite, where a direct reaction is carried out to produce ferrate. The temperatures of reactors A and B are separately set to optimize respective processes. With this process, the first reactor temperature is about 1000° C. and the second reactor temperature is 400-500° C. The peroxide reaction may be performed in a static mixer as described for a reaction of iron and Caro's acid.

While oxidants of oxone, Caro's acid, peroxide/superoxide, chlorine and hypochlorite are described herein, it is understood that other oxidants may be suitable for use. Some of these oxidants are described in an article on ferrate oxidants in *Grazzino Italiano* by Losanna. It is believed that enzymes may also be usable in ferrate process embodiments of the present invention to reduce reaction temperature.

III. Device for On-Site Generation of Ferrate

A. Solution Phase Production Device

In another aspect, the invention relates to a device for continuously synthesizing ferrate for delivery to a site of use, comprising a first holding chamber; a second holding chamber; a mixing chamber controllably connected to the first holding chamber and to the second holding chamber, into which a content of the first holding chamber and a content of a second holding chamber are added to form a first mixture; a reaction chamber controllably connected to the mixing chamber, the reaction chamber adapted to receive the first mixture and maintain the first mixture for a period of time; a ferrate mixture in the reaction chamber; and an output opening in the reaction chamber through which the ferrate mixture is adapted to be transported to the site of use, where the site of use is proximal to the reaction chamber.

In some embodiments the mixing chamber further comprises a mechanical agitator.

In other embodiments, the mixing chamber comprises a tube configured to mix the mixture as it passes through the tube.

Certain embodiments of the invention relate to a device in which the mixing chamber further comprises a temperature control device. The temperature control device may include a jacket around the mixing chamber whereby a cooled or heated fluid is passed through the jacket in order to maintain the temperature of the intraluminal space at a certain pre-determined level.

Other embodiments of the invention further comprise a pump downstream from the first and the second holding chambers and upstream from the mixing chamber. The pump controls the flow of materials into the mixing chamber.

Some other embodiments of the invention further comprise a pump downstream from the mixing chamber and upstream from the reaction chamber. This pump controls the flow of material out of the mixing chamber and into the reaction chamber.

In some of the embodiments of the invention the reaction chamber comprises a tube located between the mixing chamber and the output opening.

In another aspect the invention relates to a system for continuously synthesizing ferrate, comprising a first holding chamber containing an iron salt; a second holding chamber containing an oxidizing agent; a mixing chamber controllably connected to the first holding chamber and to the second holding chamber, into which the iron salt and the oxidizing agent are controllably added to form a mixture; a reaction chamber controllably connected to the mixing chamber, into which the mixture is kept for a period of time, and in which ferrate is synthesized, and an output opening in the reaction chamber through which the ferrate may be transported to a proximal site of use.

In some embodiments a base, as described herein, is added to the mixture. The iron salt, the oxidizing agent, the mixing chamber, and the reaction chamber are as described herein.

In certain embodiments, the device of the invention further comprises a pump downstream from the first and the second holding chambers and upstream from the mixing chamber. In other embodiments, the device further comprises a pump downstream from the mixing chamber and upstream from the reaction chamber.

FIG. 1 shows an embodiment of the solution state production device. The figure depicts two holding chambers 101. Other embodiments of the invention may exhibit additional holding chambers, depending on the number of ingredients added initially. Some embodiments of the invention may exhibit only one holding chamber 101. The holding chambers are connected to the mixing chamber 103. In some embodiments, the flow of material between the holding chambers 101 and the mixing chamber 103 may be controlled. The flow is controlled either by the presence of a pump or a valve (107)

after each holding chamber 101, or by the presence of a pump or a valve (109) before the mixing chamber 103, or by a combination thereof. In certain embodiments, no pump or valve exists between the holding chamber 101 and the mixing chamber 103.

The mixing chamber 103 is connected to the reaction chamber 105. In some embodiments, the flow of material between the mixing chamber 103 and the reaction chamber 105 may be controlled. The flow may be controlled by the presence of a pump or a valve (111) after the mixing chamber 103. In certain embodiments, no pump or valve exists between the mixing chamber 103 and the reaction chamber 105.

The reaction chamber 105 is connected with an output opening 115, through which the product of the reaction is transferred to the site of use. The flow from the reaction chamber 105 to the output opening 115 may be controlled. The control may be through the use of a pump or a valve (113). In certain embodiments, no pump or valve exists between the reaction chamber 105 and the output opening 115.

As depicted in FIG. 1A, in certain embodiments, the holding chambers 101 connect to the mixing chamber 103 via a single pipe, i.e., there is a T-junction before the mixing chamber 103. However, as depicted in FIG. 1B, in certain other embodiments, each holding chamber 101 is separately connected to the mixing chamber 103.

In some embodiments, the device of the present invention also features a temperature control unit. The temperature control unit controls the temperature of the holding chambers 101, the mixing chamber 103, the reaction chamber 105, or a combination thereof, or the temperature of the entire device. These components may be held at room temperature, at a temperature above room temperature, or at a temperature below room temperature, depending on the reaction conditions and the needs of the particular use contemplated. In some embodiments, different parts of the device are held at different temperatures, thus, requiring more than one temperature control unit for the device.

In certain embodiments, the mixing chamber 103 may just be a pipe or a hose connecting the holding chambers 101 to the reaction chamber 105. In some other embodiments, the reaction chamber 105 may just be a pipe or a hose connecting the mixing chamber 103 to the output opening 115. Therefore, in one embodiment of the invention, the entire device will comprise of a pipe or a hose connecting the holding chambers 101 to the output opening 115.

B. Solid State Production Device

In another aspect, the invention relates to a device for continuously synthesizing ferrate, comprising a holding chamber; a mover controllably connected to the holding chamber such that at least a portion of a content of the holding chamber is transferred to the mover; a heating chamber, through which at least a portion of the mover moves; an output opening in the heating chamber through which the content on the mover is adapted to be transported to a site of use, where the site of use is proximal to the heating chamber.

In certain embodiments, the mover comprises a conveyor belt. The belt is made of materials that can withstand temperatures higher than room temperature. These materials may include, but not be limited to, rubber, steel, aluminum, glass, porcelain, etc.

Some of the embodiments of the invention relate to a device that further comprises a mixer between the holding chamber and the mover.

In other embodiments, the heating chamber further comprises a temperature control device.

Other embodiments of the invention relate to a device that further comprises a storage chamber after the output opening in the heating chamber. Therefore, the conveyor belt may deposit the heated mixture into this storage chamber following the heating event.

One embodiment of the device of the present invention is depicted in FIG. 2. Starting materials are added to holding chambers 201. Some embodiments of the invention exhibit only one holding chamber 201, while others exhibit two or more holding chambers 201. The starting materials are then combined and added to a belt 203 that carries the starting materials through a heating chamber 205. The starting materials may be combined prior to their placement on the belt 203, or may be mixed on the belt 203 after they have been placed there separately.

The embodiment depicted in FIG. 2 shows that the holding chambers empty their contents into a single pipe which in turn empties the starting material through opening 211 onto the belt 203. However, in other embodiments, each holding chamber may separately empty its contents onto the belt 203.

In some embodiments, the flow of material between the holding chambers 201 and the belt 203 may be controlled. The flow is controlled either by the presence of a pump or a valve (207) after each holding chamber 201, or by the presence of a pump or a valve (209) before the opening 211, or by a combination thereof. In certain embodiments, no pump or valve exists between the holding chamber 201 and the opening 211.

In certain embodiments, the starting materials are added directly onto the belt 203. However, in other embodiments, the starting materials are added into containers that are placed on the belt. Starting materials may be added into the containers before positioning the containers on the belt, or the containers may be positioned on the belt before the starting materials are added.

The heating chamber 205 comprises a heating unit that can heat the temperature within to above room temperature. Various heating units are known in the art. In FIG. 2, the heating chamber 205 is depicted as a cylinder, though those of skill in the art realize that the heating chamber may have any shape, such as a cube or a sphere or the like. The heating unit 205 may also exhibit a temperature control unit.

The speed with which the belt travels through the heating unit, the length of the heating unit, and the temperature of the heating unit can be controlled by the operator in order to ensure that the necessary yield of ferrate is achieved. Therefore, the device of the present invention may exhibit a quality control device at the exit end of the heating unit (213) that can determine the yield of ferrate in the mixture. The quality control device may be a chemical sensor, a photochemical sensor, a spectrophotometer, or the like. The quality control device may be connected to a computer that can control the speed of the belt through the heating unit and/or the temperature of the heating unit. Therefore, if the yield of ferrate is too low, the device may automatically decrease the speed of the belt and/or increase the temperature of the heating unit. Similarly, if the yield of ferrate is too high, the device may automatically increase the speed of the belt and/or decrease the temperature of the heating unit. In other embodiments, the quality control device issues a signal to the operator of the device, where the operator may manually adjust the speed of the belt and/or the temperature of the heating unit.

At the exit end of the heating unit 213, ferrate is removed from the belt 203 and is delivered to the site of use. In some embodiments, ferrate just falls off the belt 203 and into a receiving chamber 217, where it can be delivered to the site of use through the opening 215. In other embodiments, where ferrate is in a container, the container is removed from the belt and the contents thereof are emptied into the receiving chamber, either manually or automatically.

After removing the ferrate from the belt 203, the belt 203 then loops around to receive more ferrate and repeat the process.

C. Electrochemical Production Device

In another aspect, the invention relates to a device for continuously synthesizing ferrate, comprising a reaction chamber comprising at least two electrodes and a solution of an iron salt, where the electrodes provide sufficient electric current to convert the solution of an iron salt to a solution of ferrate; a holding chamber controllably connected to the reaction chamber, into which the solution of ferrate is kept for a period of time; and an output opening in the holding chamber through which the mixture is adapted to be transported to a site of use, where the site of use is proximal to the holding chamber.

In some embodiments the reaction chamber further comprises a mechanical agitator.

In other embodiments the reaction chamber comprises a tube configured to mix the mixture as it passes through the tube.

In certain other embodiments the reaction chamber further comprises a temperature control device.

Some other embodiments of the invention further comprise a pump downstream from the reaction chamber and upstream from the holding chamber. This pump controls the flow of material out of the reaction chamber and into the holding chamber.

In some of the embodiments of the invention the holding chamber comprises a tube located between the reaction chamber and the output opening.

Figure 3:
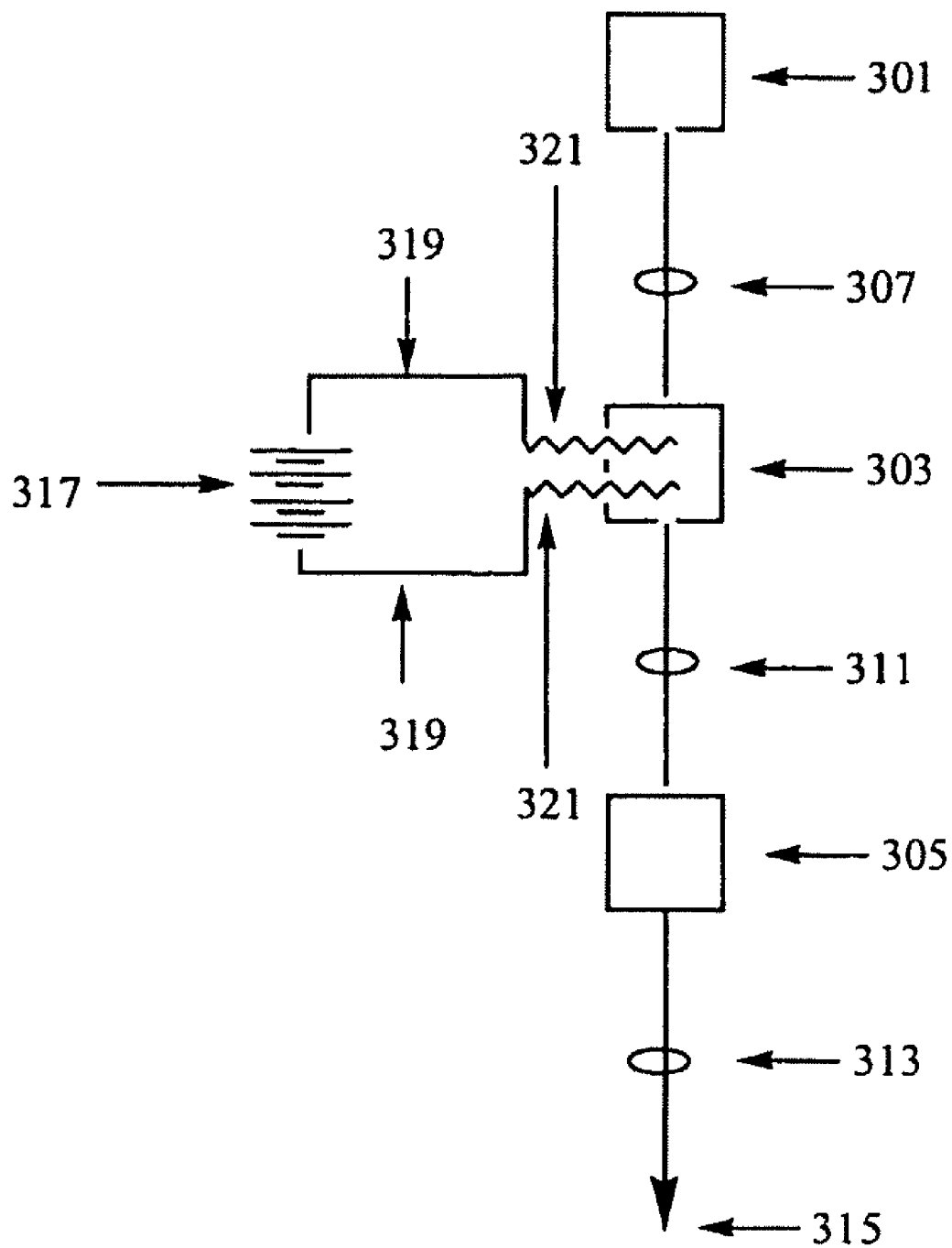
FIG. 3 depicts an embodiment of the device for electrochemical synthesis of ferrate ion.
Figure 4:
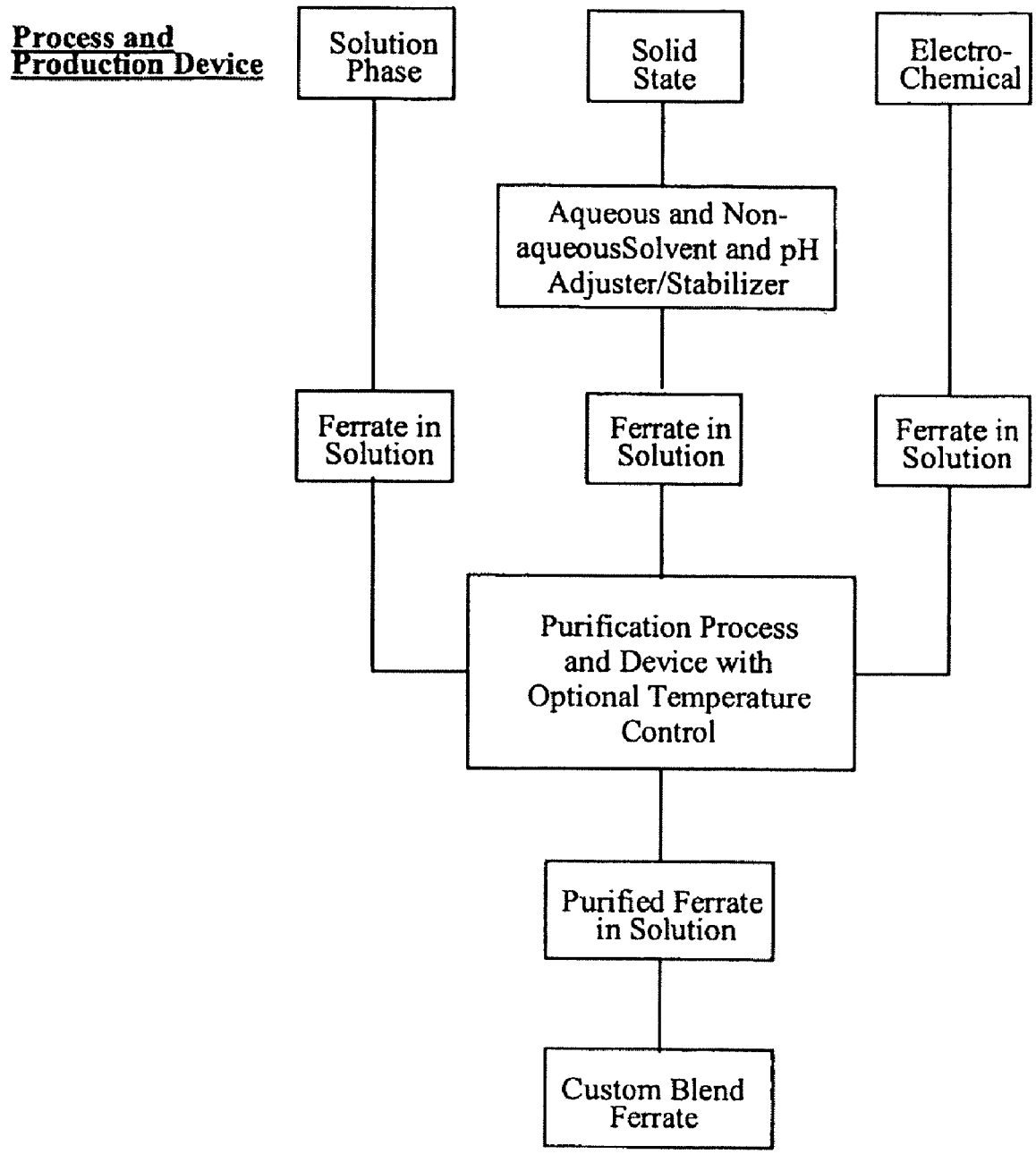
FIG. 4 is a flow chart depicting some embodiments of the process of generating and purifying ferrate.

One embodiment of the device of the present invention is depicted in FIG. 3. The figure depicts a holding chamber 301. Other embodiments of the invention may exhibit additional holding chambers, depending on the number of ingredients added initially. Some embodiments of the invention may exhibit two or more holding chambers 301. The holding chamber is connected to the reaction chamber 303. In some embodiments, the flow of material between the holding chamber 301 and the reaction chamber 303 may be controlled by the presence of a pump or a valve (307) after the holding chamber 301. If there are more than one holding chambers 301, then the flow may be controlled either by the presence of a pump or a valve (307) after each holding chamber 301, or by the presence of a pump or a valve before the reaction chamber 303, or by a combination thereof. In certain embodiments, no pump or valve exists between the holding chamber 301 and the reaction chamber 303.

The reaction chamber 303 comprises at least two electrodes 321. The electrodes are connected via wires 319 to a power source 317. The power source 317 may be an AC or a DC power source. The electrodes 321 and the power generated by the power source 317 are such that they are able to electrochemically oxidize iron, in any oxidation state below +4, to ferrate. In some embodiments, one of the electrodes is an iron electrode, which serves as both an electrode and as the source of iron for the production of ferrate. If the electrode is an iron electrode, there may or may not be a need for having a holding chamber 301 in the device. An "iron electrode" includes any electrically conducting material comprising iron.

The reaction chamber 303 is connected with an output opening 315, through which the product of the reaction is transferred to the site of use. The flow from the reaction chamber 303 to the output opening 315 may be controlled. The control may be through the use of a pump or a valve (313). In certain embodiments, no pump or valve exists between the reaction chamber 303 and the output opening 315.

In certain embodiments, there is a second holding chamber 305 between the reaction chamber 303 and the output opening 315. The second holding chamber may serve as a storage place for the generated ferrate between the time of its generation and the time of its use. The flow between the reaction chamber 303 and the second holding chamber 305 may be controlled through the use of a pump or a valve (311).

In some embodiments, the device of the present invention also features a temperature control unit. The temperature control unit controls the temperature of the holding chambers 301, the reaction chamber 303, the second holding chamber 305, or a combination thereof, or the temperature of the entire device. These components may be held at room temperature, at a temperature above room temperature, or at a temperature below room temperature, depending on the reaction conditions and the needs of the particular use contemplated.

IV. Purification/Separation of Ferrate

The ferrate produced by the methods of the present invention may be used without substantial purification. By "substantial purification" it is meant a purification step that brings the purity of the ferrate in the solution to greater than 99%, that is, a substantially pure ferrate solution is a solution in which more than 99% of the solutes comprise ferrate and its counter-ion.

However, the ferrate solution generated by the methods of the present invention may be somewhat purified or undergo a separation step. For example, the ferrate solution may be filtered to remove undissolved solids. The filtration may be physical filtration, in which particles that are too big to pass through the filter pores are removed, or surface filtration, where the particles are captured on the surface of filter grains, or a combination of one or more filtration processes.

Ferrate may also be purified using ion exchange purification. In this process, ferrate ions are reversibly bound to a solid state material, the column is purged of unwanted impurities, and then the ferrate is released from the column. The solid state material of the ion exchange column may be any of the solid state materials currently used, or designed later, for this purpose, and include without limitation, clays, zeolites, phosphonates, titanates, heteropolyacid salts, layered double hydroxides, inorganic resins, organic resins, and gel-type exchangers (e.g., as small beads in several mesh sizes), and carbon-based inorganic exchangers. Additionally, inorganics can be incorporated into organic resins to make composite exchangers for purifying ferrate.

Membranes used for purification of ferrate may be made of materials such as organic polymeric materials. The membrane materials can be cellulose or polyamide (for example, fully aromatic polyamide TFC membranes). Other membranes include, but are not limited to, microfiltration, ultrafiltration, and inorganic nanofiltration membranes. These membranes are generally made from glass, ceramics, or carbon.

Ferrate may also be purified in a direct electric field technique, during which a direct current electric field is applied across a pair of electrodes. The ferrate ions in the liquid phase are moved under the action of the field to a desired location where they are pumped out for use. The ferrate transport under the action of an electric field can be electromigration, electroosmosis, or electrophoresis.

The ferrate solution produced by the methods of the present invention may also be stored in a sedimentation tank for a period of time and the supernatant then decanted or pumped out. The ferrate solution may also pass through a centrifuge where the solution is spun such that the heavier particles in the solution sink to the bottom and the supernatant, comprising purified ferrate, is removed for further use.

In certain other embodiments, the ferrate produced by the methods of the present invention is encapsulated in a membrane for future use. The membrane may be molecular sieves, clay, porcelain, or other porous material that are not susceptible to oxidation by ferrate. Then, to use the ferrate, at least a portion of the membrane is contacted with the aqueous or gaseous mixture to be treated.

The membrane may also be slightly water soluble so that as portions of it are dissolved away, more ferrate is exposed to the aqueous mixture to be treated. In this embodiment, the use of ferrate may be in a time-release manner, the time of the release being defined by the solubility of the layers of the membrane.

The devices disclosed herein may also feature a purification component that purifies ferrate consistent with the purification methods described herein.

V. Uses of Ferrate

In another aspect, the invention relates to a method of treating, at a site of use, an aqueous mixture having one or more impurity, comprising continuously generating ferrate in a reaction chamber located proximal to the site of use; contacting the ferrate with the aqueous mixture at the site of use, whereby at least a portion of the impurity is oxidized.

In certain embodiments, the impurity is selected from the group consisting of a biological impurity, an organic impurity, an inorganic impurity, a sulfur-containing impurity, a nitrogen-containing impurity, a metallic impurity, and a radioactive impurity, or a combination thereof. Other impurities are as described herein.

An "impurity" is defined to be any component of a solution or a system, whose presence within that solution or system is repugnant to the contemplated use of that solution or system. Biological impurities are those that have a biological origin. Thus, any cells, bacteria, viruses, tissues, etc., or components thereof, whether from plants or animals, are considered to be biological impurities. Organic impurities are chemical compounds that contain at least one carbon atom. Inorganic impurities are chemical compounds that contain no carbon atoms. A sulfur-containing impurity is one which contains at least one sulfur atom. A nitrogen-containing impurity is one which contains at least one nitrogen atom. A metallic impurity is one which contains at least one metal atom, whether main group metal, transition metal, or f-block metal. A radioactive impurity is one which undergoes radioactive decay, whether by emitting $\alpha$, $\beta$, or $\gamma$ particles. Those of skill in the art recognize that a particular impurity may fall within more than one category listed above. For example, calcium ethylenediamine tetra-acetate (EDTA) impurity in water is an organic impurity, a nitrogen-containing impurity, and a metal-containing impurity.

The ferrate for use in the treatment method is produced by one of the methods set forth herein, i.e., the chemical production, the solid state production, or the electrochemical production.

The ferrate produced by the above methods is contacted with the aqueous mixture to be treated. In some embodiments the contacting step comprises adding the ferrate to a stream of the aqueous mixture. In other embodiments, the contacting step comprises contacting the ferrate to a pool of the aqueous mixture. In yet other embodiments the contacting step comprises contacting a stream of the aqueous mixture with a stationary container containing the ferrate.

Generally, the ferrate produced by the process of this invention can be used in connection with any known process and for any known purpose. The ferrate produced by the process of this invention is especially useful as an oxidant, flocculent and/or coagulant. In particular, potential uses of ferrate produced by the process of this invention include the following: removal of color from industrial electrolytic baths; manufacture of catalysts for the Fischer-Tropsch process to produce reduced hydrocarbons from carbon monoxide and hydrogen; purification of hemicellulose; selective oxidation of alkenes, alkyl side chains, organic sulfur compounds, thiols, sulfinic acids, organic nitrogen compounds, carboxylic acids, halides, alcohols and aldehydes and in oxidative coupling; as a general oxidant for water, waste water and sewage treatment; disinfection as a biocide or virocide; phosphorylase inactivator; anti-corrosion paint additive; denitration of flue gas; electrodes for batteries; detoxification of cyanide and thiocyanate from waste waters; oxygen demands measurement; cigarette filters to remove HNC and carcinogenic molecules; oxidizer for hazardous wastes and other waste solutions such as from the pulp industries; pollution control in the removal of hydrogen sulfide from low pressure gas streams; removal of pollutants with mutagenic and carcinogenic characters such as naphthalene, nitrobenzene, dichlorobenzene and trichloroethylene from waste water and drinking water without coproduction of harmful products; additive to cements as structural hardener; disinfectant to inactivate *E. coli, Salmonella, Shigella*, and other fecal coliform as a bacterial cell removal step; removing *Streptococcus* and *Staphylococcus*; biofouling control with non-corrosive oxidant for removal of slime films formed of microorganisms such as in electric power plants and shipboard cooling systems; removal of bacteria, heavy metals and inorganics in drinking water in an oxidation coagulation processes; removal of hydrogen sulfide from sour gas in the "Knox" process; delignification of agricultural residues to produce glucose and ethanol from wheat straw; magnetic filler of barium and strontium ferrate for flexible plastics having high polymer binder contents; support for other oxidizers such as chromium (VI) and $KMnO_4$; denitrification of sinter furnace off-gas; removal of impurities from solutions fed to zinc plants; decontamination of waste waters containing cyanide and thiocyanate; oxidative destruction of phenol, sulfite and thiosulfate; as a catalyst in burning of coal to remove impurities in steam gasification step; component of grinding wheels; etching agent in fluid form for evaporated films; and ceramic encapsulated rare earth metal ferrates for use in electronics where ferromagnetic properties are needed. These and other applications are discussed in Deininger, U.S. Pat. Nos. 5,202,108, 5,217,584, and 5,370,857, all of which are incorporated herein by reference in their entirety.

Additional uses of ferrate are discussed below.

A. Waste Water Treatment

As noted above, there is a need for development of safe, inexpensive and "environmentally friendly" oxidants, especially for water and wastewater treatment applications. The treatment of industrial and municipal effluents containing hazardous organic and inorganic compounds is an important research endeavor. Currently, several methods for contaminant removal exist, including adsorption, coagulation, biodegradation, chemical degradation, and photodegradation. Chemical degradation is often the most economically feasible as well as the easiest method for water treatment and usually involves chlorine, hypochlorite, or ozone. Although effective, these oxidants often have deleterious side effects. Chlorine and ozone are poisonous and highly corrosive gases.

Hypochlorite is generally supplied as a solid or in aqueous solution; however, it is generated using chlorine gas and can rapidly decompose back into chlorine upon heating or chemical mishandling. Also, although hypochlorite, $OCl^-$, is used as a chlorine source for water treatment at smaller operations, it is expensive.

Additionally, the handling of chlorine, or hypochlorite, poses potential danger to workers due to its high toxicity. A major disadvantage of chlorine and chlorine-containing oxidants is that excess chlorine can produce chlorinated oxidation products (e.g., chloramines, chlorinated aromatics, chlorinated amines or hydrocarbons), many of which are potential mutagens or carcinogens, and may be more toxic than the parent contaminants and/or more difficult to remove. Because these compounds potentially constitute a health hazard for the public, a move away from chlorine use is needed.

The ferrate produced by the methods of the present invention may be used in treating waste water, sewage, or sludge. It is well known in the art that ferrate reacts with organic or inorganic compounds and biological entities, such as cells, bacteria, viruses, etc. In this reaction, the substrates are oxidized to biologically inactive products. The ferrate molecule itself is reduced to Fe(III), which precipitates out of the solution as $Fe(OH)_3$ or other Fe(III) salts. The iron containing salts can be easily filtered out, leaving iron-free water containing innocuous by-products.

*Escherichia coli*, *Salmonella*, and *Shigella* are all members of the Enterobacteriaceae. These bacteria and certain others known to those of skill in the art have similar physiological characteristics, including being rod shaped gram-negative facultatively anaerobic organisms. *E. coli* has long been used as an indicator of fecal pollution in water systems and there is a large volume of disinfection literature available for this particular organism. Ferrate is an effective biocidal agent against suspended bacterial cultures in clean systems. Ferrate has the capacity to rapidly inactivate several known pathogens at fairly low concentrations.

Ferrate is also an effective disinfectant against viruses, such as the F2 virus. Ferrate has been studied for its antiviral activities and has been found to be effective in inactivating viruses (Kazama, Wat. Sci. Tech. 31(5-6), 165-168 (1995).) Ferrate also coagulates turbidity in water system and inactivates most enteric pathogens at ferrate concentrations which are reasonable for use in a water and wastewater treatment facility.

The biocidal properties of ferrate have also been investigated (Y. Yamamoto, Mizu Shori Gijutsu, Vol. 24, p, 929 (1983)). An important property of ferrate toward its application as a water treatment agent is its ability to act as a potent biocide. Ferrate has been used for disinfection in river water treatment, as well as in municipal sewage treatment processes; with its use, removal of coliform bacteria depends on the pH. It has been shown to be effective against *E. coli* and *sphaerotilus* (F. Kazama, J. Ferment. Bioeng., Vol. 67, p. 369 (1989)). Ferrate has also been used to remove coliform bacteria from treated sewage and river water (F. Kazama and K. Kato, Hamanashi Daigaku Kogakubu Kenkyu Hokoku, Vol. 35, p. 117 (1984)).

In addition, ferrate can be used to oxidize ammonia in the secondary effluent from water treatment plants. The major oxidation product is nitrogen, while some nitrites are also present in the products. Both of these oxidation products are environmentally friendly.

The above properties of ferrate can be exploited at municipal or industrial water treatment plants. A ferrate producing device can be installed in close proximity of the water treatment facility. Waste from the municipal sewer lines or the industrial effluent lines is mixed with freshly produced ferrate on site. The ferrate producing device can produce as much or as little ferrate as is necessary to react with all the waste present in the effluent.

Since ferrate is an efficient disinfectant, it has potential for use in lieu of extensive chlorination of drinking water. As pollution increases, the need exists for a water purifying agent that can be safely used by the individual on "small" quantities of drinking water as well as at the municipal/industrial wastewater level. Such purification agents should ideally be able to disinfect and remove suspended particulate materials, heavy metals (including radioisotopes) and some organics through flocculation, in order to at least partially destroy dissolved organic contaminants through oxidation, and as a final step, to remove itself from solution. A one-step purification reagent which meets these criteria is $FeO_4^{2-}$, ferrate. This ion is able to successfully compete with the current two-step, chlorination/ferric sulfate, flocculation technique, thereby circumventing the production of toxic or carcinogenic halogenated organics.

Since ferrate has multipurpose oxidant-coagulant properties, it is very attractive for the treatment of waste produced by chemical and pharmaceutical companies. These companies spend billions of dollars a year in clean up costs for contaminated water used, or produced, in their processes. Almost all of the waste produced by these companies can be oxidized to relatively harmless by-products by ferrate, leaving water that can be released to the municipal sewage systems and be treated without any special care. Thus, any company that produces waste water laced with organic, inorganic, or biological impurities can install a ferrate producing device at the end of its effluent line.

Municipal sewage systems suffer a special burden. They are overloaded with any imaginable waste, most of which is organic or biological. Once the large objects are filtered out, the sewer facilities must deal with the soluble waste remaining behind. Normally, waste water facilities filter the waste water through activated charcoal or other filters that have an affinity for organic compounds, or biologically treat the wastewater. These processes are slow and costly. The slow response of these facilities to the in-flow of wastewater often results in sewer overflows during storms. In coastal communities this results in raw and untreated sewage spilling into the ocean or lake nearby, causing environmental damage. While oxidants may easily be used to remove the unwanted waste rapidly, the oxidants currently available on the market are either cost prohibitive, or produce by-products that are at times more environmentally unsafe than the waste itself.

Also, there is a vital need for new methods for $H_2S$ control in municipal sanitary sewer systems and treatment plants, and industrial waste treatment facilities. One of the ongoing major problems in waste water treatment is severe corrosion of facility structures from contact with hydrogen sulfide gas, $H_2S$, or its oxidation products after contact with air. Equally important are the health risks from exposure to $H_2S$ gas for even short periods of time; such exposure is reported to be the leading cause of death among sanitary sewer workers.

Another major problem with the evolution of $H_2S$ gas is its foul smell that causes discomfort to those exposed to it.

Ferrate is known to be useful in a variety of waste water treatment applications. Ferrate oxidations, and their application to waste water treatment, have been studied with a view toward using ferrates in several industrial applications, in particular with a number of organic and inorganic substrates. (J. D. Carr, P. B. Kelter, A. Tabatabai, D. Spichal, J. Erickson, and C. W. McLaughlin, Proceedings of the Conference on Water Chlorination and Chemical Environmental Impact Health Effects, pp. 1285-88 (1985)). The applicability of ferrate in waste treatment involves not only its oxidative abilities, but also other multipurpose properties, such as its floc formation, disinfective properties, and generally remediative faculties.

Direct filtration of ground water using ferrate has been examined at the pilot plant level (T. Waite, Environ. Sci. Technol., Vol. 17, p. 123 (1983)). Biofouling control has been investigated (R. L. Bartzatt and D. Nagel, Arch. Env. Health, 1991, Vol. 46(5), pp. 313-14 (1991)). The coagulative properties of ferrate have been found to be useful for turbidity removal (S. J. de Luca, C. N. Idle, A. C. Chao, Wat. Sci. Tech. 33(3), 119-130 (1996)). Studies have shown that when model condensers were dosed with $10^{-5}$ M solutions of ferrate twice a day, for 5 minutes, biofilm growth was inhibited (T. Waite, M. Gilbert, and C. Hare, Water Tech/Qual., pp. 495-497 (1976)).

Ferrate oxidative destruction of nitrosamines, which are potent carcinogens, in waste water has been reported (D. Williams and J. Riley, Inorg. Chim. Acta, Vol. 8, p. 177 (1974)).

Relatively low ferrate doses have been found to profoundly reduce the BOD (biological oxygen demand) and TOC (total organic carbon) in domestic secondary effluents (F. Kazama and K. Kato, Kogabkubu Kenkyu Kokou, Vol. 35, pp. 117-22 (1984)).

Ferrate can be employed for the treatment of mill effluent and sewage sludge from municipal sources. Treatment at 125-1000 mg of $K_2FeO_4$/L dose levels was found to significantly decrease the chemical oxygen demand on manganese ($COD_{Mn}$), due to partial oxidation of the high molecular weight organics. Decreases in the UV spectrum after treatment with ferrate have been interpreted as removal of fulvic and humic acids within the iron(III) coagulate produced when the ferrate was reduced (F. Kazama and K. Kato, Kogabkubu Kenkyu Kokou, Vol. 34, pp. 100-4 (1984)).

Polyaminocarboxylates such as diethylenetriaminepentaacetate (DTPA), ethylenediaminetetracetate (EDTA), and nitriloacetate (NTA) are synthetic ligands that form stable complexes with most of the metals and are used in a variety of industrial applications such as photographic developing, paper production, and textile dyeing. Ethylenediaminedisuccinic acid (EDDS) forms hexadentate chelates with transition metals and is used in consumer products, e.g., washing powder. EDTA is a constituent of formulations for chemical decontamination of the primary heat transport system of nuclear power reactors. The presence of heavy metals, along with polyaminocarboxylates has been reported at many US Department of Energy (DOE) sites. These polyaminocarboxylates are either poorly biodegradable (e.g., EDTA), associated with other safety regulatory issues (e.g., NTA) or little effective (e.g., citrate). Ferrate can be applied to degrade polyaminocarboxylates and metal-polyaminocarboxylates to simple products.

Certain compounds are listed in the EPA Contaminant Candidate List (CCL). These include diazion, disulfoton, fonofos, terbufos, cyanazine, prometon, 1,2-diphenylhydrazine, nitrobenzene, acetochlor, 2,4,6-trichlorophenol, and 2,4-dichlorophenol. These compounds can be oxidized by ferrate.

The gasoline additive methyl tert-butyl ether (MTBE) is a ubiquitous groundwater contaminant. The U.S. geological Survey National Water Quality Assessment Program has identified it in 27% of urban wells tested. A more recent survey indicated that between 5 and 10% of all community drinking wells in the United States have detectable MTBE contamination. It persists in petroleum-contaminated aquifers. MTBE in groundwater can be oxidized to relatively non-hazardous compounds using ferrate.

Trichloroethene (TCE), a nonflammable solvent used in large quantities in industry, is one of the most common organic ground water contaminants and is classified as a "probable human carcinogen." TCE is sequentially reduced to dichloroethene (DCE) isomers, chloroethene (CE), and ethene. The use of ferrate in remediating contaminated groundwater is attractive due to ease of field implementation and the relatively low cost.

Highly chlorinated phenol derivatives, such as pentachlorophenol (PCP) have been listed as a priority pollutant by the United States Environmental Protection Agency. PCP is mainly used as a wood preservative and general biocide. PCP is a suspected carcinogen and its pyrolysis and combustion reaction products are considerably more toxic than PCP itself. Ferrate can be utilized in degradation of PCP.

Ferrate can also be applied to effluent streams from agrochemical industry. One of the common products from an agricultural industry, the herbicide trifluaraline is a pre-emergent, cellular and nuclear division inhibitor. It is highly toxic for humans. Ferrate can be applied to effluent streams of agrochemical industry containing compounds such as trifluraline.

Dyes present in wastewater, which originated from the textile industry, are of particular environmental concern since they give undesirable color to the waters. They are also generally harmful compounds and can lead to toxic byproducts through hydrolysis, partial oxidation, or other chemical reactions taking place in the waste phase. The decolorization and degradation of different classes of textile dyes from the textile industry can be achieved using ferrate.

In pharmaceutical and fine chemical manufacturing, organic transformations are routinely carried out using oxidizing agents based on transition metal compounds. One of the biggest problem areas in synthetic methodology is selective oxidations. For example, the oxidation of alcohols carried out with Cr(VI) or Mn(VII) lack specificity and selectivity. Ferrate is selective and specific in these reactions. The nontoxic properties of the Fe(III) byproduct makes ferrate an environmentally safe oxidant. Ferrate can be utilized in organic synthesis, thereby reducing the environmental impact of the oxidation processes and also reducing their cost ("green chemistry").

Thiourea and its derivatives are known corrosion inhibitors and are used as chemical complexing agents to clean scales developed in industrial equipment, like boilers and nuclear reactors. Because of the toxicity of thiourea to aquatic organisms, the treatment of boiler chemical cleaning wastes (BCCWs) is required before their disposal. Ferrate can easily remove thiourea and its derivatives from BCCWs.

Oil refineries and coke processing plants generate sulfur and cyanide containing compounds. These contaminants are toxic and environmentally significant due to their offensive odor. In addition, their presence may not be acceptable in the environment due to their high oxygen demand. Ferrate can be applied to petroleum industry effluents to eliminate odor related to sulfur and cyanide containing compounds.

Drinking water supplies are sometimes plagued by odors resulting from the presence of manganese(II). Manganese(II) causes aesthetic problems such as colored water, turbidity, staining, and foul taste. Manganese(II) can also accelerate biological growth which further exacerbates odor problems. Mn(II) is removed by oxidation of soluble Mn(II) with a ferrate to sparingly soluble hydroxide and oxide solid phases, MnOOH(s) and $MnO_2$(s), respectively.

Decontamination of chemical warfare agents is required on the battlefield as well as in pilot plants, and chemical agents production, storage, and destruction sites. Ferrate can oxidize chemical warfare agents such as VX [O-ethyl-S-(2-diisopropylamino)ethylmethylphosphono-thioate], GD (pinacolyl methylphosphonofluoridate), GB (2-propylmethylphosphonofluridate), mustard gas (2,2'-dichlorodiethyl sulfide), and HD [bis(2-chloroethyl) sulfide]. Ferrate has many applications such as environmentally friendly "hasty" decontamination on the battlefield where speed and ease of application of the decontaminate is essential.

During recovery of natural gas and crude oil from offshore and onshore production operations, produced waters are generated, containing complexed mixtures of organic and inorganic materials. Approximately, 12 billion barrels of produced water are produced in the US annually. This large volume causes major environmental problems. The water toxicity and organic loading generally characterize the impact of produced water to the environment. The treatment with ferrate can reduce the organic loading and acute toxicity of the oil field produced water.

Water supplies containing arsenic compounds are a worldwide health concern. Tens of thousands of people already show symptoms of arsenic poisoning. A maximum of ten microgram/L of arsenic in water is the threshold value recommended by the World Health Organization and the European Community. Current removal procedures are not adequate to meet criteria for ambient arsenic in water supplies. Steps involving oxidation, adsorption, and precipitation can be carried out by ferrate in removing arsenic from water.

In recent years, there has been increasing concern for the presence of natural organic matter (NOM) in potable surface and ground water supplies. One reason for concern is related to the formation of disinfection byproducts (DPB's) from the treatment of water by chlorination methods. Oxidation of NOM by chlorination produces chlorinated hydrocarbons, many of which are known or suspected carcinogens. Ferrate has excellent potential to serve as an environmentally friendly remediation treatment for reducing levels of DPB's in drinking water. This process would not form toxic chlorinated organics and may also effectively mineralize NOM to carbon dioxide, potentially eliminating the production of DPB's entirely.

Ferrate solution can be used to develop a method for protecting iron and steel castings from corrosion. This procedure is based on the formation of ferric oxide from the decay of the thin film of ferrate on the metal. In this procedure, a mixture of alkaline metal ferrate and alkaline solution containing a reducing agent is brought into contact with metal surfaces.

There are several disadvantages of using metal salts such as alum, ferric chloride, and ferrous sulfate in removing solids from a solution. First, binding of water to the metal ions creates a gelatinous sludge with a high water content that increases dewatering costs. Second, the water becomes more acidic after the addition of salts, causing a decrease in the coagulant property of the salt. Thirdly, the formation of metal-phosphate complexes causes phosphate levels in the solution to decrease and, as a result, phosphate becomes less available to bacteria. This upsets the biological function of the system. Synthetic organic polymers are used as common coagulants and flocculents to replace metal salts. To achieve this end, a large quantity of polymer is required, which makes the process expensive. There are also several disadvantages to using a synthetic polymer. Synthetic polymers release toxic materials into water due to solubility of polymers. In addition, solubility is also greatly influenced by environmental factors such as temperature and pH. Polymers are very sensitive to the quality of water and also have little effect on BOD. A combination of polymers and ferrate can be advantageous. This combination can require less amount of coagulant and thus be cost-effective. Polymer-ferrate complexes can be formed to eliminate the toxicity from the solubility of polymers. Polymer-ferrate complexes can also have multi-purpose properties and can be less sensitive towards quality of water.

A ferrate producing device located at a waste water facility will be useful in overcoming all of the above-described problems faced by these facilities. The device of the present invention can produce inexpensive ferrate rapidly. Ferrate can be injected into the flow of waste water and mixed therewith, thereby oxidizing and removing the unwanted waste. Ferrate oxidation of organic and inorganic compounds results in environmentally safe by-products. In addition, the iron containing salt by-products can easily be filtered off and removed from the waste water. This eliminates the need to repeatedly pass waste water through filters, activated charcoal, or geological reactors, or incubating the waste water in pools of anaerobic bacteria for digestion of the organic waste.

The on-site generation of ferrate removes two of the problems associated with its use today: cost and instability. Because ferrate is produced on site and can be applied immediately after its production, little or no attention must be paid to the fact that it is unstable. The ferrate is simply introduced into the waste water before it has had a chance to decompose. In addition, the application of ferrate requires no need for purification, crystallization, or storage; therefore, the cost of its use is very low. Furthermore, the ferrate produced by the device of the invention requires lesser amounts of expensive feed stock.

B. Treatment of Recreational Water

The ferrate generated by the methods of the present invention can be used in pool and spa applications. It is well known that pools, Jacuzzis, and spas become polluted with organic waste. The waste enters the water from the body of the swimmers or by wind or insects. If left untreated, the water becomes turbid and foul. Usual methods of treatment include the addition of oxidants such as bleach and anti-bacterial or anti-fungal agents. These treatments create unwanted side-effects. The oxidants that are left in the water have an adverse effect on the skin of the swimmers using the water. In addition, the oxidants create environmentally harmful by-products, such as chlorinated hydrocarbons.

The device of the present invention can be fitted to any swimming pool or Jacuzzi such that the ferrate produced by the device is mixed with the water in a mixing chamber, whereby all the organic waste is oxidized to innocuous products, the iron salts are filtered away, and the clean water is re-introduced into the pool. This represents a highly effective and cost-efficient method of cleaning the pool water, since ferrate produced by the methods of the present invention is less costly in the long run than purchasing the numerous oxidants and anti-fungal chemicals necessary to treat a pool.

C. Use in Processing Plants

Many processing plants generate aqueous streams comprising biosolids such as proteins, carbohydrates, fats, and oils which must be treated to remove the potentially valuable biosolids products before the stream can be discharged from the plant. These aqueous streams are often derived from food processing plants and have solids contents of about 0.01% to 5% on a weight basis. This invention provides a process for clarification of such streams, whereby the solids are flocculated, and biosolids are optionally separated from the solids. The biosolids can subsequently be used, for example, in animal feeds.

As defined herein, to "flocculate" means to separate suspended biosolids from a stream comprising biosolids, where the biosolids become aggregated and separate to the top or bottom of the stream in which the biosolids had previously been suspended. Flocculation produces a flocculated material, which, if desired, can be physically separated from the stream. In the present invention, it is desirable to maximize the size of the flocculated material in order to facilitate removal of this material from the stream.

The process of this invention involves treating an aqueous stream comprising biosolids by contacting the stream with ferrate. The aqueous stream can be derived from any number of processes, which generate such streams, such as from animal and vegetable processing, including processing for non-food uses.

In the process of this invention, the aqueous stream to be treated can be from any processing plant that produces an aqueous stream comprising biosolids, such as food processing plants. For example, animal slaughterhouses and animal processing plants and other food processing plants may produce aqueous streams comprising protein, fats and oil. Animal slaughterhouses and processing plants include those for cattle, hogs, poultry and seafood. Other food processing plants include plants for vegetable, grain and dairy food processing plants for processing soybeans, rice, barley, cheese, and whey; plants for wet-milling of starches and grains; as well as breweries, distilleries and wineries. Biosolids present in aqueous streams from these processes may include sugars, starches and other carbohydrates in addition to protein, fats, and oils. For example in processing soybeans, proteins are extracted into an aqueous stream from which they are subsequently recovered. The present invention is especially useful for treating streams from animal processing, and more particularly, from poultry processing.

While this invention is useful in conventional food processing operations, which produce aqueous suspensions of biosolids, it should be recognized that this invention is also useful in treatment of aqueous suspensions of biosolids derived from processing of food (animal or vegetable) materials, which may have non-food end uses. For example, when separated and recovered, proteins are useful in certain cosmetics and other skin care formulations; starch has numerous non-food uses, including uses in paper manufacture. Further still, this invention is useful to treat in general, any aqueous stream comprising biosolids, which may result from non-food processing operations. Moreover, though the biosolids, as disclosed above, are generally suspended in a substantially aqueous stream, the concentration of biosolids dissolved in the stream depends on the properties of the stream or the biosolids such as, for example, pH, salinity, or other parameters.

The process of this invention involves treatment of an aqueous stream containing biosolids, for example, proteins, to reduce suspended solids (as measured by turbidity) and optionally to separate the biosolids. The biosolids can be recovered for subsequent use. It should be recognized that this process can capture both suspended biosolids as well as soluble materials, such as those present in blood and sugars.

The flocculated biosolids can optionally be separated from the treated stream by conventional separation processes such as sedimentation, floatation, filtering, centrifugation, decantation, or combinations of such processes. The separated biosolids can subsequently be recovered and used in numerous applications. It has also been surprisingly found that the recovered biosolids from this process have reduced odor when dry relative to those recovered from a process using ferric chloride as part of a flocculating system. The flocculated biosolids can be separated and recovered by known techniques, such as those mentioned above.

E. Use in Radioactive Clean Up

The process of the present invention is also useful for the precipitation of radioactive materials, particularly uranium, dissolved in aqueous solutions. The dissolved radioactive materials may be from a naturally flowing stream, or a uranium mining operation water treatment plant. The water from the stream is destined to be treated by a conventional city water treatment facility for drinking and home use.

Ferrate has been proposed as a treatment agent for the removal of radionuclides (transuranics) from waste water. To date, the focus has been on the nuclear industry, where ferrate is used to remove uranium and transuranic elements from contaminated water. In addition, there is currently an interest in using ferrate in the removal of plutonium and americium from waste water effluent.

U.S. Pat. No. 4,983,306 to Deininger discloses a method for transuranic element polishing from radioactive wastewater using $FeO_4^{2-}$ that involves adjusting the pH of a transuranic element-containing water source to a range of 6.5-14.0. Supposedly, removal occurs by co-precipitation of the transuranics within the ferric hydroxide matrix similar to other heavy metals. Also, small amounts of a chemical are used compared to common technology. Based on chemical dosages, radioactive sludge generation using this method is reduced by 3-20%, depending on the suspended solids content in the wastewater feed (Deininger, et al., Waste Manage. '90, vol. 1, pp. 789-795 (1990)).

F. Use in Surface Cleaning

Dilute solutions of ferrate can be used for oxidizing pretreatment of chromium (III) oxide containing films, resulting from corrosion of base metal surfaces of piping systems and the like, to render the corrosion films more amenable to conventional chemical cleaning treatments. There is an existing need for replacement of currently used laboratory oxidants, especially the chromate derivatives. Chromate and chlorine are of environmental concern, and in chromate oxidations, Cr(III) is formed, which is a suspected carcinogen. Also, in permanganate reactions, $MnO_2$ is generated.

Removal of heavy metals, such as Cu, Cd, and Mn using ferrate is also known. Ferrate has been shown to remove colloidal suspensions and heavy metals through flocculation (T. Suzuki, Odaku Kenkyu, Vol. 11 (5), p. 293-296 (1988)). The mechanism for Mn removal involves the oxidative formation of insoluble $MnO_2$ and subsequent entrapment of these metals into the $Fe(OH)_3$ precipitate resulting from ferrate's reduction product. Cu and Cd are removed in a similar manner. The removal of heavy metal ions and humic acid by coagulation after treatment with potassium ferrate has been studied. Metal ions are generally trapped during sedimentation (F. Kazama and K. Kato, Kogyo Yosui, Vol. 357, p. 8-13 (Chemical Abstract 110:63421y) (1988)).

Additionally, metallic surfaces, such as those used in medical devices or in the semi-conductor industry, need to be cleaned or disinfected. Current methods for cleaning metal surfaces require their exposure to disinfectants, such as bleach, that are highly corrosive. Consequently, the metal parts corrode and routinely fail due to fatigue and need to be replaced. Aside from the high cost of replacing the corroded metal pieces, the failure of the instruments create discomfort and annoyance for the users and liabilities for the manufacturers.

Ferrate produced by the methods of the present invention can be used to clean the surfaces of these metal parts. Ferrate is not corrosive and does not damage the integrity of the metal piece. As mentioned above, the biocidal activity of ferrate is comparable to that of bleach. Therefore, ferrate provides an efficient, effective, and economical means by which these metal surfaces can be cleaned.

G. Medical Uses

In the medical arts, there is a great need to disinfect and clean instruments and surfaces. The ferrate generating device of the present invention can be used in a hospital setting for such a use.

In certain other embodiments, the ferrate generated by the methods of the present invention may be used to treat a wound, as described in U.S. Pat. No. 6,187,347, which is incorporated herein by reference in its entirety.

H. Use in Treating Bilge Water

The ferrate generated according to the present invention may be used to treat bilge water.

The restoration and maintenance of the chemical, physical and biological integrity of navigable water ways, including rivers, streams, lakes and oceans are increasingly receiving greater attention. Legislation has been enacted and regulations promulgated requiring certain procedures and establishing standards for restoring and maintaining the chemical, physical and biological integrity of navigable waters, including rivers, streams, lakes and oceans. One regulation governs the discharge of oil and other hazardous substances into navigable waters. Boaters and marine maintenance services are subject to such regulations due to the potential for the discharge of hazardous substances from boats, and particularly due to the potential for the discharge of contaminated bilge water.

It is periodically necessary to clean the bilge of a vessel due to the collection of stagnant, fouled, contaminated or otherwise dirty water. This stagnant, fouled, contaminated or otherwise dirty water typically includes oil, gasoline and/or diesel fuel which can create hazardous conditions and be particularly difficult to remove from the bilge. Certain laws and regulations prohibit may "discharge," which includes any spiking, spilling, leaking, or dumping of any kind of oil in any form including fuel oil, gasoline, lubricating oil and oil mixed with water in a vessel's bilge. Bilge water must be periodically pumped from the bilge of a boat. Bilge water may be fouled by a wide variety of contaminants, including motor oils, transmission, power steering and hydraulic trim fluids, fuel from the engine (gas or diesel), and solvents and paints used during repair and cleaning. Furthermore, bilge water may be contaminated with bacteria, flora, and/or fauna incompatible with the waters into which is intended to be discharged.

For this reason, bilge water is commonly cleaned or otherwise decontaminated and then the treated bilge water is removed from the bilge at a discharge station. Liquid cleaners may be used, added to the bilge water and after a short period of time, the boat is taken to a discharge station and the treated bilge water is pumped out. Such liquid cleaners do not satisfactorily break down the oil or the other organic materials and often leave an oil film in the bilge. If the liquid cleaner leaves a residue of oil, gasoline or the like, the residue contributes to the conditions which will require a subsequent cleaning and may enhance corrosion of the materials used in manufacturing the vessel. Furthermore, certain known liquid cleaners are non-biodegradable and may further contribute to the pollution problem. Thus, although there do exist systems for the filtrations and/or decontamination of bilge water, such in-line systems, capable of automatically cleaning and/or decontaminating bilge water prior to its discharge overboard are not sufficient to meet current needs, extremely complicated, cost prohibitive, or not widely accepted by either industry or relevant regulatory authorities.

The disclosed method may be used to generate ferrate for the cost-effective on-site treatment of bilge water, and the disclosed device may be readily fitted such that, for example, the ferrate produced according to the methods or by the device disclosed herein is mixed with the bilge water in a mixing chamber, whereby oil and/or organic contaminants are oxidized to innocuous products, the iron salts are filtered away, and the clean bilge water is then dispensed. This represents a highly effective and cost-efficient method of decontaminating bilge water; ferrate produced by the present methods is less costly than purchasing numerous oxidants and other known methods of treating bilge water.

I. Ballast Water Treatment Using Ferrate

The introduction of non-indigenous species into marine ecosystems by the shipping industry is an ever-increasing problem. Contamination is caused by species carried on ship hulls and in ballast water into new marine environments. Ship hull contamination has been minimized through the use of antifoulants; however transport of potentially harmful phytoplankton, microorganisms, viruses, and invertebrates in ballast water and sediments threatens marine environments throughout the world. Documentation of the introduction of aquatic nuisance species (ANS) and harmful consequences are reported in the literature and range from paralytic shellfish poisoning by dinoflagellates to European zebra mussel infestation in the Great Lakes. The resulting ecosystem impacts and environmental degradation have severe economic implications.

Ballast water is used to stabilize ships as cargo is loaded and unloaded. The volume of shipboard ballast water ranges from less than 100,000 to 14 million gallons (USEPA, 2001) or approximately 400 to 56,000 $m^3$. It is estimated that over 21 billion gallons of ballast water are discharged into US waters each year, containing as many as 10,000 marine specimens. Historically, the best practice for control of ANS has been mid-ocean exchange, which has limited effectiveness due to incomplete water removal. Some studies put the organism removal efficiency by mid-ocean exchange as low as 25% (USEPA, 2001). In addition, mid-ocean exchange can be dangerous, particularly in storm conditions, some ships are not structurally designed for ballast water exchange, it is not applicable to lake shipping, and it is difficult to verify effectiveness. A National Research Council Report and the Global Pollution Water Management Program both identify shipboard treatment processes as the most desirable approach to managing ANS(NRC, 1996; Globallast, Global Ballast Water Management Program, $1^{st}$ International Ballast Water Treatment Standards Workshop Report, IMO, London, March 2001.). These treatment processes include physical separation, ultraviolet (UV) treatment, chemical biocides, heating, ultrasound, magnetic fields and a combination of these processes. A brief description of the more established technologies including physical separation, UV treatment, and biocides is provided below.

Ballast Water Treatment Options.

Proven physical ballast water treatment processes include cyclonic separation and filtration. Cyclonic separation has been shown to be quite effective at removing larger particles and biota (Glosten-Herber-Hyde Marine, "Full-Scale Design Studies of Ballast Water Treatment Systems," Prepared for the Great Lakes Ballast Technology Demonstration Project, Northeast-Midwest Institute, Washington, D.C., April 2002; Sutherland, T. F. C. D. Levings, C. C. Elliott, W. W. Hesse 2001. Effect of a ballast water treatment system on Survirvorship of natural populations of marine plankton. (*Marine Ecology Progress Series*, 210:139-148 (2001)). Centrifugal force is applied as water is forced through a vortex at high velocity. Larger material is pushed to the periphery of the spinning fluid and ejected in a reject stream (approximately 5-10% of the total flow) and discharged overboard. Advantages of this treatment process are that it involves proven technology, can be retrofitted into a ship, can be automated, and has low pumping requirements. However, it does not completely remove turbidity, which may impact downstream processes; has almost no removal capability for microorganisms, viruses, and phytoplankton; and is expensive to install.

Filtration units are frequently used for water treatment and can be designed to remove particulate matter as small as 0.01 μm. However, filters capable of removing these small materials are extremely expensive and cannot handle large flows typical of many ships. Units capable of removing particles greater than 50 μm are more applicable to shipboard operations; however, while they would effectively remove zooplankton and some phytoplankton, they will not remove microorganisms. Filter units can be automated, but the process of backwashing to remove entrained material adversely impacts ballast water pumping.

Ultraviolet treatment of ballast water has been evaluated at laboratory and pilot-scale (Sutherland et al, 2001 and Waite T. D. et al. "Removal of natural populations of marine plankton by a large-scale ballast water treatment system" *Marine Ecology Progress Series*, 258:51-63 (2003)). Again this treatment process has a proven history in standard water and wastewater applications. In laboratory studies UV treatment of cyclone treated ballast water was found to be more effective in removing bacteria and viruses than zooplankton and phytoplankton. Evidence of DNA repair during storage was observed for some phytoplankton, resulting in regrowth. Cyclone pretreatment was necessary to reduce turbidity that might otherwise interfere with UV effectiveness.

Various chemical biocides have been utilized including chlorine, glutaraldehye, SeaKleen, and acrolein (USEPA, 2001). These chemicals can be injected into ballast fill or discharge lines, thus requiring minor retrofitting of equipment. However, while these biocides are quite effective at controlling microorganisms and small zooplankton, sizeable doses are required to kill larger aquatic species resulting in high costs and potentially excessive residuals. Discharging of ballast water containing residual biocides is problematic. Physical separation is therefore necessary as a first stage treatment to reduce chemical dosage requirements.

In all cases, cost estimates suggest that shipboard treatment using current technology is orders of magnitude more expensive than mid-ocean exchange. The identification of a low-cost and highly-effective treatment approach is mandatory to prevent the spread of ANS that will have a regulatory and economic impact on worldwide shipping.

Full-Scale Implementation.

The Globalast Workshop (Globalast, 2001) has identified minimum design requirements for implementing shipboard ballast water treatment facilities. These include (1) minimal environmental impact, (2) effective in destroying target biological species, (3) safe for both the crew and the facilities, (4) compatible with ship needs and requirements, and (5) cost effectiveness. In addition other implementation considerations include the following: (1) treatment on intake or discharge, (2) regrowth potential (if the removal is less than 100%), (3) cross contamination from piping and/or tanks, (4) effects of vibration and ship movement, (5) corrosion due to salt water environment, and (6) the need for automation and minimal operator attention (Glosten-Herber-Hyde Marine, 2002). Any assessment of a ballast water treatment approach must include consideration for these requirements.

Ferrate (VI)—An Environmentally Friendly Solution.

Iron in +6 oxidation state, (ferrate), can meet these requirements economically due to its strength as an oxidant, disinfectant, and coagulant all delivered in one treatment chemical. Most importantly, its treatment by-product is non-toxic Fe(III).

Treatment of ballast water by Fe(VI) does not result in any mutagenic/carcinogenic by-products, which make ferrate an environmentally-friendly solution. Moreover, the ferric oxide produced from Fe(VI), acts as a powerful coagulant that is suitable for the removal of metals, non-metals, and humic acids (Qu, J-H, H-J. Liu, S-X. Liu, P. J. Lei. 2003 Reduction of fulvic acid in drinking water by ferrate. *J. Environ. Engg.* 129: 17-24).

Fe(VI) shows excellent disinfectant properties and can eliminate a wide variety of microorganisms at very low ferrate doses. In contrast to UV technology, ferrate inactivation to microorganisms is irreversible. Ferrate can interfere with both polymerase and nuclease activities and to degrade deoxyribonucleosides (Reddy, G. V. B. Nanduri, A. Basu, M. J. Modal. 1991 Ferrate oxidation of murine leukemiavirus reverse transcriptase: identification of the template-primer binding domain. *Biochemistry* 30: 8195-8201; Stevenson C. J. H. Davies. 1995 Potassium ferrate as DNA sequencing reagent and probe of secondary structure. *Biochem. Soc. Trans.* 23: 387S). This mechanism is responsible for unique disinfection capability of ferrate.

Removal of total and fecal coliform by ferrate in wastewater has been tested (Kazama, F. 1995 Viral inactivation by potassium ferrate. *Water Sci. Technol.* 31: 165-168; Kazama, F. 1994 Inactivation of coliphage Qβ by potassium ferrate. *J. Ferment. Bioeng.* 67: 369-373; Jiang et al. 2002). Ferrate treatment of water sources collected worldwide has achieved complete removal of total coliforms. Chlorine resistant bacteria can be easily treated with ferrate. For example, an aerobic spore-formers can be reduced up to 3-log units while sulfite-reducing clostridia are effectively killed by Fe(VI). Fe(VI) also rapidly inactivates virus f2 at low concentrations in water (Schink, T. T. D. Waite 1980 Inactivation of f2 virus with ferrate(VI). *Water Research* 14: 1705-1717). Ferrate treatment removed algae in water in conjunction with alum (Ma, J. W. Liu. 2002 Effectiveness and mechanism of potassium ferrate(VI) preoxidation for algae removal by coagulation. *Water Research* 36: 871-878).

We have conducted preliminary ferrate disinfection tests of harbor waters at two locations in the Port of Cape Canaveral, Fla. Sample A was collected at the inner Port, while Sample B was collected closer to the exit at the Port nearer to the open ocean. The results for Total Coliform, *E. coli*, and Heterotrophic bacterial plate counts are summarized in the table below:

| Ferrate dose | Total Coliform MPN/100 mL | | E. Coli MPN/100 mL | | HPC cfu/mL | |
|---|---|---|---|---|---|---|
| $FeO_4^{2-}$, mg/L | A | B | A | B | A | B |
| 0.0 | 341 | 122 | 82 | 5 | 365 | 710 |
| 0.5 | <1 | <1 | <1 | <1 | N/A | N/A |
| 1.0 | <1 | <1 | <1 | <1 | N/A | N/A |
| 2.0 | <1 | <1 | <1 | <1 | <5 | <5 |

The total coliform in Sample A was reduced to non-detectable levels with the addition of a very small ferrate dose of only 0.5 mg/L. Ferrate disinfection for *Eschericha coli* (*E. coli*) in both samples was also examined. Again, ferrate was effective in killing *E. coli* at a very low dose (0.5 mg/L). The levels of Heterotrophic bacteria in both samples A and B were also reduced to non-detectable values by ferrate at a dose of approximately 2 mg/L. The results in Table 1 clearly demonstrate the ferrate's potential for treating bacterial species in ballast water.

Thus, in another aspect, the present invention relates to a method of treating ballast water, comprising:
a) mixing an iron salt and an oxidizing agent in a mixing chamber to provide a mixture;
b) delivering at least a portion of the mixture to a reaction chamber;
c) continuously generating ferrate in the reaction chamber;
d) delivering at least a portion of the ferrate to a site of use that is proximal to the reaction chamber, wherein said site of use is a site where said ballast water is held;
e) contacting said ferrate with said ballast water, whereby organic matter in said ballast water is oxidized; and
f) adding additional iron salt and oxidizing agent to the mixing chamber.

By "ballast water" it is meant any volume of water that is used in a ship or other floatable device, such as a cargo container, a barge, a submarine, and the like, in order to stabilize the ship or the floatable device and prevent the ship or the floatable device from capsizing when cargo or additional weight is added or removed from the ship or the floatable device.

The ballast water may be held in the cargo-hold of the ship or the floatable device, or in any other chamber within the ship or the floatable device. In some embodiments, ferrate is added to the ballast water as the ballast water is held within the chamber. In other embodiments, ferrate is added to the ballast water as the ballast water is being pumped, or otherwise introduced, into the chamber. In yet other embodiments, ferrate is added to the ballast water as the ballast water is being pumped out of, or otherwise removed from, the chamber. In other embodiments, the ballast water is mixed with ferrate prior to being pumped into the ship or the floatable device.

In some embodiments, the device for generating ferrate is located on the ship, or nearby, whereby the output valve for the device is connected to the location of ballast water by a hose or a pipe, so that ferrate is directly injected into the ballast water. In other embodiments, the ferrate is generated at a site proximal to the site where the ballast water is located, and the ferrate is taken there in a vessel, such as a tank, drums, buckets, etc.

As disclosed herein, ballast water comprises organic matter, such as marine plants, animals, algae, bacteria, ameba, viruses, etc. Ferrate, as a strong oxidant, is capable of oxidizing the organic matter, and thereby killing some, or all, of the living organisms within the ballast water, and/or render some or all of the organic matter biologically inactive. In some embodiments, the level of biologically active organic matter in ballast water is reduced to a level at or below a level set forth by the proper authority at a particular port city, state, or country.

In another aspect, the present invention relates to a method of synthesizing ferrate, comprising:
a) mixing an aqueous solution comprising an iron salt and an oxidizing agent in a mixing chamber to form a solution of ferrate;
b) delivering at least a portion of the solution of ferrate to a site of use that is proximal to the mixing chamber, wherein said site of use is a site where said ballast water is held; and
c) contacting said ferrate with said ballast water, whereby organic matter in said ballast water is oxidized.

VI. Some Embodiments of the Invention

Some of the embodiments of the invention refer to the following:

A method of continuously synthesizing ferrate, comprising:
a) mixing an aqueous solution comprising an iron salt and an oxidizing agent in a mixing chamber;
b) delivering at least a portion of the aqueous solution to a reaction chamber;
c) continuously generating ferrate in the reaction chamber;
d) delivering at least a portion of the ferrate to a site of use that is proximal to the reaction chamber; and
e) adding additional aqueous solution to the mixing chamber.

The above method, where the additional aqueous solution in step (e) is added in an amount to substantially replace the portion of the aqueous solution delivered to the reaction chamber.

The above method, further comprising adding a base to the aqueous solution.

The above method, where the base comprises an ion selected from the group consisting of a nitrogen base, the hydroxide ion, the oxide ion, and the carbonate ion, or a combination thereof.

The above method, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

The above method, where the oxidizing agent comprises at least one of the following: a hypohalite ion, a halite ion, a halate ion, a perhalate ion, ozone, oxone, halogen, a peroxide, a peracid, a salt of a peracid, and Caro's acid, or a combination thereof.

The above method, where the oxidizing agent comprises a hypohalite ion selected from the group consisting of the hypochlorite ion, the hypobromite ion, and the hypoiodite ion.

The above method, where the oxidizing agent comprises a halite ion selected from the group consisting of the chlorite ion, the bromite ion, and the iodite ion.

The above method, where the oxidizing agent comprises a halate ion selected from the group consisting of the chlorate ion, the bromate ion, and the iodate ion.

The above method, where the oxidizing agent comprises a perhalate ion selected from the group consisting of the perchlorate ion, the perbromate ion, and the periodate ion.

The above method, additionally comprising repeating steps (b) through (d).

A method of treating, at a site of use, an aqueous mixture having at least one impurity, comprising
 a) continuously generating ferrate in a reaction chamber located proximal to the site of use;
 b) contacting the ferrate with the aqueous mixture at the site of use, whereby at least a portion of the impurity is oxidized.

The above method, where the impurity is selected from the group consisting of a biological impurity, an organic impurity, an inorganic impurity, a sulfur-containing impurity, a metallic impurity, and a radioactive impurity, or a combination thereof.

The above method, where the step of continuously generating ferrate comprises the steps of:
 a) mixing an aqueous solution comprising an iron salt and an oxidizing agent in a mixing chamber;
 b) delivering at least a portion of the aqueous solution to a reaction chamber;
 c) continuously generating ferrate in the reaction chamber;
 d) delivering at least a portion of the ferrate to a site of use that is proximal to the reaction chamber; and
 e) adding additional aqueous solution to the mixing chamber.

The above method, where the additional aqueous solution added in step (e) is in an amount to substantially replace the portion of the aqueous solution delivered to the reaction chamber.

The above method, further comprising adding a base to the aqueous solution.

The above method, where the base comprises an ion selected from the group consisting of the hydroxide ion, the oxide ion, and the carbonate ion, or a combination thereof.

The above method, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

The above method, where the oxidizing agent comprises a component selected from the group consisting of a hypohalite ion, a halite ion, a halate ion, a perhalate ion, ozone, oxone, halogen, a peroxide, a peracid, a salt of a peracid, and Caro's acid, or a combination thereof.

The above method, where the oxidizing agent comprises a hypohalite ion selected from the group consisting of the hypochlorite ion, the hypobromite ion, and the hypoiodite ion.

The above method, where the oxidizing agent comprises a halite ion selected from the group consisting of the chlorite ion, the bromite ion, and the iodite ion.

The above method, where the oxidizing agent comprises a halate ion selected from the group consisting of the chlorate ion, the bromate ion, and the iodate ion.

The above method, where the oxidizing agent comprises a perhalate ion selected from the group consisting of the perchlorate ion, the perbromate ion, and the periodate ion.

The above method, where the contacting step comprises adding the ferrate to a stream of the aqueous mixture.

The above method, where the contacting step comprises contacting the ferrate to a pool of the aqueous mixture.

The above method, where the contacting step comprises contacting a stream of the aqueous mixture with a stationary container containing the ferrate.

The above method, additionally comprising repeating steps (b) through (d).

A device for continuously synthesizing ferrate for delivery to a site of use, comprising:
 a) a first holding chamber;
 b) a second holding chamber;
 c) a mixing chamber controllably connected to the first holding chamber and to the second holding chamber, into which a content of the first holding chamber and a content of a second holding chamber are added to form a first mixture;
 d) a reaction chamber controllably connected to the mixing chamber, the reaction chamber adapted to receive the first mixture and maintain the first mixture for a period of time;
 e) a ferrate mixture in the reaction chamber; and
 f) an output opening in the reaction chamber through which the ferrate mixture is adapted to be transported to the site of use,
where the site of use is proximal to the reaction chamber.

The above device, where the mixing chamber further comprises a mechanical agitator.

The above device, where the mixing chamber comprises a tube configured to mix the mixture as it passes through the tube.

The above device, where the mixing chamber further comprises a temperature control device.

The above device, further comprising a pump downstream from the first and the second holding chambers and upstream from the mixing chamber.

The above device, further comprising a pump downstream from the mixing chamber and upstream from the reaction chamber.

The above device, where the reaction chamber comprises a tube located between the mixing chamber and the output opening.

A system for continuously synthesizing ferrate, comprising:
 a) a first holding chamber containing an iron salt;
 b) a second holding chamber containing an oxidizing agent;
 c) a mixing chamber controllably connected to the first holding chamber and to the second holding chamber, into which the iron salt and the oxidizing agent are controllably added to form a mixture;
 d) a reaction chamber controllably connected to the mixing chamber, into which the mixture is kept for a period of time, and in which ferrate is synthesized, and
 e) an output opening in the reaction chamber through which the ferrate is adapted to be transported to a proximal site of use.

The above system, further comprising adding a base to the mixture.

The above system, where the base comprises an ion selected from the group consisting of the hydroxide ion, the oxide ion, and the carbonate ion, or a combination thereof.

The above system, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

The above system, where the oxidizing agent comprises a component selected from the group consisting of a hypohalite ion, a halite ion, a halate ion, a perhalate ion, ozone, oxone, halogen, a peroxide, a peracid, a salt of a peracid, and Caro's acid, or a combination thereof.

The above system, where the oxidizing agent comprises a hypohalite ion selected from the group consisting of the hypochlorite ion, the hypobromite ion, and the hypoiodite ion.

The above system, where the oxidizing agent comprises a halite ion selected from the group consisting of the chlorite ion, the bromite ion, and the iodite ion.

The above system, where the oxidizing agent comprises a halate ion selected from the group consisting of the chlorate ion, the bromate ion, and the iodate ion.

The above system, where the oxidizing agent comprises a perhalate ion selected from the group consisting of the perchlorate ion, the perbromate ion, and the periodate ion.

The above system, where the mixing chamber further comprises a mechanical agitator.

The above system, where the mixing chamber comprises a tube configured to mix the mixture as it passes through the tube.

The above system, where the mixing chamber further comprises a temperature control device.

The above system, further comprising a pump downstream from the first and the second holding chambers and upstream from the mixing chamber.

The above system, further comprising a pump downstream from the mixing chamber and upstream from the reaction chamber.

The above system, where the reaction chamber comprises a tube located between the mixing chamber and the output opening.

A method of purifying drinking water comprising contacting ferrate generated by the above methods with the drinking water, where the contacting is at a site proximal to the generation site.

A method of purifying waste water comprising contacting ferrate generated by the above methods with the waste water, where the contacting is at a site proximal to the generation site.

A method of purifying sewage comprising contacting ferrate generated by the above methods with the sewage, where the contacting is at a site proximal to the generation site.

A method of cleaning surgical instruments comprising contacting ferrate generated by the above methods with the surgical instruments, where the contacting is at a site proximal to the generation site.

A method of removing radioactive materials from an aqueous solution comprising contacting ferrate generated by the above methods with the aqueous solution, where the contacting is at a site proximal to the generation site.

A method of cleaning a metallic or a polymer surface comprising contacting ferrate generated by the above methods with the metallic or a polymer surface, where the contacting is at a site proximal to the generation site.

A method of coating a metallic or a polymer surface comprising contacting ferrate generated by the above methods with the metallic or a polymer surface, where the contacting is at a site proximal to the generation site.

A method of continuously synthesizing ferrate, comprising:
a) providing a mixture of an iron salt and an oxidizing agent;
b) continuously delivering at least a portion of the mixture to a heating chamber;
c) exposing the mixture to elevated temperatures in the heating chamber, thereby generating ferrate;
d) removing at least a portion of the ferrate generated in step c) from the heating chamber;
e) adding additional mixture to the heating chamber.

The above method, where the additional mixture added to the heating chamber is in an amount to substantially replace the portion of the ferrate removed from the heating chamber.

The above method, further comprising adding a base to the mixture.

The above method, where the base comprises an ion selected from the group consisting of a nitrogen base, the hydroxide ion, the oxide ion, and the carbonate ion, or a combination thereof.

The above method, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

The above method, where the oxidizing agent comprises a component selected from the group consisting of a hypohalite ion, a halite ion, a halate ion, a perhalate ion, halogen, a peroxide, a peracid, a salt of a peracid, and Caro's acid, or a combination thereof.

The above method, where the oxidizing agent comprises a hypohalite ion selected from the group consisting of the hypochlorite ion, the hypobromite ion, and the hypoiodite ion.

The above method, where the oxidizing agent comprises a halite ion selected from the group consisting of the chlorite ion, the bromite ion, and the iodite ion.

The above method, where the oxidizing agent comprises a halate ion selected from the group consisting of the chlorate ion, the bromate ion, and the iodate ion.

The above method, where the oxidizing agent comprises a perhalate ion selected from the group consisting of the perchlorate ion, the perbromate ion, and the periodate ion.

The above method, where the mixture exposed to elevated temperature is a solid.

A device for continuously synthesizing ferrate, comprising:
a) a holding chamber;
b) a mover controllably connected to the holding chamber such that at least a portion of a content of the holding chamber is transferred to the mover;
c) a heating chamber, through which at least a portion of the mover moves;
d) an output opening in the heating chamber through which the content on the mover is adapted to be transported to a site of use,
where the site of use is proximal to the heating chamber.

The above device, where the mover comprises a conveyor belt.

The above device, further comprising a mixer between the holding chamber and the mover.

The above device, where the heating chamber further comprises a temperature control device.

The above device, further comprising a storage chamber after the output opening in the heating chamber.

A device for continuously synthesizing ferrate, comprising:
a) a reaction chamber comprising two electrodes and a solution of an iron salt, where the electrodes provide sufficient electric current to convert the solution of an iron salt to a solution of ferrate;
b) a holding chamber controllably connected to the reaction chamber, into which the solution of ferrate is kept for a period of time; and
c) an output opening in the holding chamber through which the mixture is adapted to be transported to a site of use, where the site of use is proximal to the holding chamber.

The above device, where the reaction chamber further comprises a mechanical agitator.

The above device, where the reaction chamber comprises a tube configured to mix the mixture as it passes through the tube.

The above device, where the reaction chamber further comprises a temperature control device.

The above device, further comprising a pump downstream from the first and the second holding chambers and upstream from the reaction chamber.

The above device, further comprising a pump downstream from the reaction chamber and upstream from the holding chamber.

The above device, where the holding chamber comprises a tube located between the reaction chamber and the output opening.

A method of continuously synthesizing ferrate, comprising:
a) continuously providing an aqueous solution comprising an iron salt in a reaction chamber, where the reaction chamber comprises at least two electrodes;
b) providing sufficient electric current to the at least two electrodes to convert at least a portion of the iron salt to ferrate;
c) delivering at least a portion of the ferrate to a site of use that is proximal to the reaction chamber; and
d) adding additional aqueous solution to the reaction chamber.

The above method, where the additional aqueous solution added in step (d) is in an amount sufficient to substantially replace the portion of the aqueous solution delivered to the reaction chamber.

The above method, further comprising adding a base to the aqueous solution.

The above method, further comprising adding an acid to the aqueous solution.

The above method, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

A method of synthesizing ferrate, comprising:
a) mixing an aqueous solution comprising an iron salt and an oxidizing agent in a mixing chamber to form a solution of ferrate;
b) delivering at least a portion of the solution of ferrate to a site of use that is proximal to the mixing chamber.

The above method, further comprising adding a base to the aqueous solution.

The above method, where the base comprises an ion selected from the group consisting of a nitrogen base, the hydroxide ion, the oxide ion, and the carbonate ion, or a combination thereof.

The above method, where the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, or a combination thereof.

The above method, where the oxidizing agent comprises a component selected from the group consisting of a hypohalite ion, a halite ion, a halate ion, a perhalate ion, ozone, oxone, halogen, a peroxide, a peracid, a salt of a peracid, and Caro's acid, or a combination thereof.

The above method, where the oxidizing agent comprises a hypohalite ion selected from the group consisting of the hypochlorite ion, the hypobromite ion, and the hypoiodite ion.

The above method, where the oxidizing agent comprises a halite ion selected from the group consisting of the chlorite ion, the bromite ion, and the iodite ion.

The above method, where the oxidizing agent comprises a halate ion selected from the group consisting of the chlorate ion, the bromate ion, and the iodate ion.

The above method, where the oxidizing agent comprises a perhalate ion selected from the group consisting of the perchlorate ion, the perbromate ion, and the periodate ion.

A method of treating, at a site of use, an aqueous mixture having at least one impurity, comprising
a) continuously generating ferrate in a reaction chamber located proximal to the site of use;
b) contacting the ferrate with the aqueous mixture at the site of use, whereby at least a portion of the impurity is coagulated.

EXAMPLES

Example 1

Preparation of Ferrate(VI)

The following is one representative embodiment of a laboratory procedure for synthesizing ferrate. Add 75 mL distilled water to a 250 mL beaker. Add 30 g of NaOH to result in a 10 M solution. Cool the caustic solution in an ice bath. Pump $Cl_2(g)$ (approximately 6.5 g) into the solution while mixing. Add a second batch (70 g) of NaOH to the hypochlorite solution. Keep the solution cool. Coarse filter the precipitated salt residue. Add 25 g of $Fe(NO_3)_3.9H_2O$ while stirring. Filter through medium coarse filter. Analyze the $Fe^{6+}$ yield using UV-Vis spectroscopy by observing absorbance at about 510 nm.

Example 2

Synthesis and Measurement of Ferrate

Ferrate is synthesized using the procedure of Example 1, except 16.35 g of chlorine was used instead of 6.5 g, and 25 g NaOH is used as the second caustic addition instead of 70 g. 40 g of coarse-glass-frit-filtered caustic/hypochlorite solution is added to a mL jacketed reaction vessel containing a TEFLON®-coated magnetic stirring bar. Controlled temperature water is circulated through the jacket to control and establish the reaction temperature. 5.0 g of ferric nitrate nonahydrate ($Fe(NO_3)_3.9H_2O$) is added over a period of a few minutes to begin the experiment.

| Temperature is set at 30° C. | | | | | | |
|---|---|---|---|---|---|---|
| Time, min | Actual Wt*, (g) | Expected Absorbance† | Observed Absorbance | Fraction of Iron in (VI) State | Actual Reaction Temperature, °C. | Notes |
| 0 | | | | | 22.4 | Begin iron addition |
| 2 | | | | | 27 | Complete iron addition |
| 2.5 | | | | | 30 | |
| 3.5 | | | | | 33.9 | Beginning of reaction noted |
| 5 | 0.33 | 1.04 | 0.25 | 0.24 | 31.1 | |
| 10 | 0.32 | 1.01 | 0.40 | 0.40 | 30.7 | |
| 17 | 0.31 | 0.98 | 0.48 | 0.49 | 30.4 | |
| 25 | 0.33 | 1.04 | 0.59 | 0.57 | 30.4 | |
| 35 | 0.32 | 1.01 | 0.60 | 0.59 | 30.3 | |
| 45 | 0.34 | 1.08 | 0.695 | 0.64 | 30.5 | |

*Actual Wt: For the spectrophotometric analysis, an aliquot of the reaction solution is taken gravimetrically and diluted with pH 10 buffer. This is the weight of the aliquot. The dilution is to 100 g. The pH 10 buffer solution is prepared by combining 10.0 g sodium phosphate, dibasic and 0.71 g of a 40 g/L sodium borate solution with enough distilled water to make one liter of buffer solution.
†Expected Absorbance: "Expected Absorbance" refers to the theoretical absorbance of the solution if all of the iron in the solution had been converted to Fe(VI). The weight of the aliquot represents a fraction of the total amount of iron in the experiment. If all of this iron is present as ferrate, this is the computed absorbance value of the solution. In combination with the observed absorbance, the computed result facilitates determination of the fraction of iron in the +6 state.

The concentration of Fe(VI) is measured by the absorbance (A) of a buffered sample of the reaction product solution, relative to the blank pH 10 buffer solution, with a UV-Vis spectrophotometer set at a wavelength of 510 nm. The formula for the fraction of iron converted to Fe(VI) is as follows:

$$\text{fraction converted} = \frac{A \times 100 \times RSW \times MWIS}{MAC \times 1000 \times SW \times wtISinR}$$

where

A=absorbance measurement

RSW=the reaction solution weight (total weight in grams)

SW=the sample weight of the reaction solution taken to combine with 49.7-49.85 g buffer solution (about 0.3-0.15 g, respectively)

MWIS=molecular weight of the iron source wtISinR=weight of iron source used in reaction (in grams)

100=volume of buffer solution in cc's

1000=volumetric conversion factor for cc/L

MAC=molar absorptivity coefficient, which is equal to 1150/Mcm for Fe(VI) in the pH 10 buffer solution at 510 nm A=MAC×p×c p=path length of the absorbance cell (cm)

c=concentration of Fe(VI) in g-moles per liter

| Temperature is set at 35° C. | | | | | | |
|---|---|---|---|---|---|---|
| Time, min | Actual Wt, gm | Expected Absorbance | Observed Absorbance | Fraction of Iron in (VI) State | Actual Reaction Temperature, °C. | Notes |
| 0 | | | | | 24 | Begin iron addition |
| 2 | | | | | 28.6 | Complete iron addition |
| 2.5 | | | | | 32 | |
| 3.5 | | | | | 37 | Beginning of reaction noted |
| 5 | 0.32 | 0.285 | 1.01 | 0.28 | 36 | |
| 10 | 0.34 | 0.52 | 1.08 | 0.48 | 35.4 | |
| 17 | 0.34 | 0.61 | 1.08 | 0.56 | 35.3 | |
| 25 | 0.34 | 0.67 | 1.08 | 0.62 | 35.3 | |
| 35 | 0.31 | 0.68 | 0.98 | 0.69 | 35.3 | |
| 45 | 0.34 | 0.813 | 1.08 | 0.75 | 35.3 | |
| 60 | 0.43 | 1.11 | 1.36 | 0.82 | 35.2 | |

This example shows that, under the given conditions, maximum conversion of Fe(III) and maximum yield of Fe(VI) requires at least 60 minutes of reaction time; and that Fe(VI) formation, in this case, is enhanced at 35° C. over that obtained at 30° C.

Example 3

Preparation of Ferrate(VI)

Ferrate is synthesized using the procedure of Example 1, except 13 g of chlorine was used instead of 6.5 g, and 25 g NaOH is used as the second caustic addition instead of 70 g. Reaction vessel is a jacketed beaker maintained at 35° C. Begin with 20 g of caustic/hypochlorite solution. Gradually add 1.6 g of ferric nitrate nonahydrate crystals. This is a 5 fold stoichiometric excess of hypochlorite over ferric(III). The maximum temperature achieved during this step was 39° C.

| Time, min | Actual weight, gm | Expected absorbance | Actual absorbance | Fraction of Iron in the (VI) state | Actual reaction temperature, ° C. |
|---|---|---|---|---|---|
| 15 | 0.3233 | 1.36 | 0.86 | 0.63 | 35.2 |
| 30 | 0.3427 | 1.44 | 1.14 | 0.79 | 35.2 |
| 45 | 0.2984 | 1.26 | 1.10 | 0.87 | 35.2 |
| 60 | 0.3289 | 1.39 | 1.25 | 0.90 | 35.2 |

This example shows that, compared with Example 2, the Fe(VI) yield is increased by using more excess hypochlorite and caustic solution relative to the Fe(III) content of the reaction mixture. In this example, the volume of pH 10 buffer solution used was 50 cc instead of 100 cc.

Example 4

Ferrate (VI) Decay Rates

Ferrate (VI) is synthesized and measured according to the procedures of Examples 1 and 2, except that the following reactant quantities are used:

| Experiment | Fe(NO$_3$)$_3$•9H$_2$O (g) | NaOH (g) | Cl$_2$ (g) |
|---|---|---|---|
| A | 6.01 | 13.6 | 3.24 |
| B | 4.19 | 13.6 | 3.47 |
| C | 2.41 | 13.6 | 3.24 |

In each case, the jacketed reaction vessel temperature is controlled at 35° C. for about the first 2 hours and then allowed to slowly cool to ambient conditions (about 23° C.).

| Experiment A | | Experiment B | | Experiment C | |
|---|---|---|---|---|---|
| Reaction Time (min.) | Fraction of Fe in (VI) State | Reaction Time (min.) | Fraction of Fe in (VI) State | Reaction Time (min.) | Fraction of Fe in (VI) State |
| 0 | 0 | 0 | 0 | 0 | 0 |
| 15 | 0.40 | 15 | 0.50 | 28 | 0.75 |
| 30 | 0.44 | 30 | 0.59 | 43 | 0.85 |
| 45 | 0.44 | 45 | 0.65 | 60 | 0.90 |
| 60 | 0.42 | 60 | 0.69 | 75 | 0.91 |
| 120 | 0.37 | 75 | 0.71 | 90 | 0.93 |
| 180 | 0.34 | 105 | 0.73 | 120 | 0.93 |
| 240 | 0.29 | 175 | 0.74 | 150 | 0.93 |
| 300 | 0.27 | 239 | 0.76 | 210 | 0.94 |
| 360 | 0.25 | 359 | 0.76 | 270 | 0.95 |
| 390 | 0.22 | 479 | 0.76 | 390 | 0.95 |
| 1410 | 0.16 | 1395 | 0.58 | 506 | 0.96 |
| | | 1500 | 0.56 | 566 | 0.96 |
| | | 1745 | 0.49 | 1466 | 0.92 |
| | | 2920 | 0.33 | 1576 | 0.91 |
| | | | | 1816 | 0.89 |
| | | | | 2991 | 0.86 |

These experiments show that ferrate (VI) is not stable over long time periods; however, the stability and the half-life for decomposition improve with higher ferrate yields. These experiments also exemplify the concept of generating ferrate at a site proximal to the site of use such that the two sites are within a distance that allows for the ferrate to travel the distance within a half-life of its decomposition. In this example, the half-life of the ferrate in Experiments A and B is approximately 400 min and 2250 min, respectively. The half-life of ferrate in Experiment C is greater than 3000 min; however, the consumption of Cl$_2$ and NaOH per unit weight of Fe(VI) is significantly greater than that for Experiments A or B.

Example 5

Synthesis of Ferrate (VI) with Commodity Feeds

In this example, ferrate (VI) is synthesized with readily available commodity liquid bleach (13.4 wt % NaOCl), commodity liquid caustic (50.5 wt % NaOH), and 50 wt % ferric chloride in water solution. Initially 30.03 g of bleach solution is placed in a beaker containing a TEFLON®-coated magnetic stirring bar and the bleach beaker is cooled in an ice/water bath to about 15° C. Then 37.06 g of caustic solution is slowly added to the bleach with stirring such that the temperature is maintained at about 15-20° C. The bleach/caustic solution is then transferred to a jacketed reaction vessel. Then 2.97 g of 50% ferric chloride solution is injected into the bleach/caustic solution with a syringe needle positioned below the liquid level of the stirred bleach/caustic solution. The jacketed reaction vessel control temperature is then set at 30° C., and sample aliquots (about 0.3 g) are taken about every 30 minutes for Fe(VI) yield measurements according to the procedure described in Example 2. In this case, the yield of ferrate peaked out at 68%.

Example 6

Synthesis of Ferrate (VI) with Commodity Feeds

Ferrate (VI) is synthesized utilizing the same liquid feed materials and methodology as those used in Example 5, except 55.59 g of caustic solution is used instead of 37.06 g. In this case, the yield of ferrate (VI) peaked out at 81%.

Example 7

Preparation of Ferrate(VI)

Ferrate is synthesized using the procedure of Example 1, except that 17 g of chlorine was used instead of 6.5 g. 40 grams of coarse glass frit filtered solution of hypochlorite in saturated sodium hydroxide solution is added to a 50 mL Pyrex beaker with a TEFLON® stirring bar. The beaker is placed in a large crystallizing dish on a magnetic stirrer plate. The crystallizing dish has a water/ice mixture to maintain a temperature of 19-20° C. Five grams of ferric nitrate nonahydrate is added over a period of four minutes to begin the experiment. The iron salt distributes through the mixture but there is no visually apparent activity for a few minutes. The temperature of the reaction mixture slowly rises. About 10 minutes after the start of the iron addition, the mixture turns dark purple. Simultaneously, the reaction temperature peaks at 31° C. At this point, a timer is started for the taking of samples for Ferrate(VI) analysis. The water/ice bath maintains a constant temperature of 19-20° C.

| Time, min | Actual Wt, g | Expected Absorbance | Observed Absorbance | Fraction of Iron in (VI) State | Actual Reaction Temperature, ° C. |
|---|---|---|---|---|---|
| 2 | 0.30 | 0.95 | 0.37 | 0.39 | 29 |
| 6 | 0.39 | 1.24 | 0.66 | 0.53 | 26 |
| 10 | 0.31 | 0.98 | 0.55 | 0.56 | 23 |
| 15 | 0.32 | 1.02 | 0.64 | 0.63 | 22 |
| 25 | 0.30 | 0.95 | 0.64 | 0.67 | — |
| 35 | 0.29 | 0.92 | 0.66 | 0.72 | — |
| 45 | 0.33 | 1.05 | 0.76 | 0.72 | — |
| 60 | 0.31 | 0.98 | 0.71 | 0.72 | — |

Example 8

Preparation of Ferrate(VI)

Ferrate is synthesized using the procedure of Example 1.30 g of NaOH plus 75 g of water were mixed in the reaction chamber, followed by the addition of 6.5 g of $Cl_2$. Another 70 g of NaOH is added. The solution phase of this is reacted with 25 grams of ferric nitrate.

| Experiment | Temp, ° C. | Caustic, 1st/2nd | Chlorine, g | Iron Form | C vs. B‡ | Agitation |
|---|---|---|---|---|---|---|
| 1 | 30 | 30/25 | 13 | 25/60 Fe/$H_2O$ | C | T fitting |
| 2 | 30 | 30/10 | 13 | 25/60 Fe/$H_2O$ | C | T fitting |
| 3 | 30 | 30/0 | 10 | 25/60 Fe/$H_2O$ | C | T fitting |
| 4 | 35 | 30/0 | 10 | 25/60 Fe/$H_2O$ | C | T fitting |
| 5 | 40 | 30/0 | 10 | 25/60 Fe/$H_2O$ | C | T fitting |
| 6 | 35 | 15/0 | 7.5 | 25/60 Fe/$H_2O$ | C | T fitting |
| 7 | 30 | 30/25 | 13 | 25/60 Fe/$H_2O$ | B | Blade |
| 8 | 30 | 30/10 | 13 | 25/60 Fe/$H_2O$ | B | Blade |
| 9 | 30 | 30/0 | 10 | 25/60 Fe/$H_2O$ | B | Blade |
| 10 | 35 | 30/0 | 10 | 25/60 Fe/$H_2O$ | B | Blade |
| 11 | 40 | 30/0 | 10 | 25/60 Fe/$H_2O$ | B | Blade |
| 12 | 35 | 15/0 | 7.5 | 25/60 Fe/$H_2O$ | B | Blade |
| 13 | 30 | 30/25 | 13 | 25/60 Fe/$H_2O$ | C | Passive |
| 14 | 30 | 30/10 | 13 | 25/60 Fe/$H_2O$ | C | Passive |
| 15 | 30 | 30/0 | 10 | 25/60 Fe/$H_2O$ | C | Passive |
| 16 | 35 | 30/0 | 10 | 25/60 Fe/$H_2O$ | C | Passive |
| 17 | 40 | 30/0 | 10 | 25/60 Fe/$H_2O$ | C | Passive |
| 18 | 35 | 15/0 | 7.5 | 25/60 Fe/$H_2O$ | C | Passive |
| 19 | 30 | 30/25 | 13 | 25/60 basepm* | C | Passive |
| 20 | 30 | 30/10 | 13 | 25/60 basepm | C | Passive |
| 21 | 30 | 30/0 | 10 | 25/60 basepm | C | Passive |
| 22 | 35 | 30/0 | 10 | 25/60 basepm | C | Passive |
| 23 | 40 | 30/0 | 10 | 25/60 basepm | C | Passive |
| 24 | 35 | 15/0 | 7.5 | 25/60 basepm | C | Passive |
| 25 | 35 | 30/0 | 10 | 25/30 sol 1† | C | Passive |
| 26 | 35 | 30/0 | 10 | 25/30 sol 2 | C | Passive |
| 27 | 35 | 30/0 | 10 | 25/30 sol 3 | C | Passive |
| 28 | 35 | 30/0 | 10 | 25/30 sol 4 | C | Passive |
| 29 | 35 | 30/0 | 10 | 25/30 sol 5 | C | Passive |
| 30 | 35 | 30/0 | 10 | 25/30 sol 6 | C | Passive |

*Basepm means pre mix the iron solution with some of the NaOH in a short loop before contacting the bleach.
†Sol 1, 2, 3, 4, 5 and 6 means small chelating molecule which might be needed to stabilize the iron with respect to loss by precipitation as insoluble iron oxide. This approach might also make it possible to reduce the amount of water in the recipe, this helps by concentrating all of the species to improve the kinetics. This may also cut down on forms of iron which are hostile to either ferrate (VI) or bleach or both.
‡C vs. B means continuous vs. batch.

Example 9

Preparation of Ferrate(VI)

Ferrate is synthesized using the procedure of Example 1, except 12.9 g of chlorine was used instead of 6.5 g and the second addition of sodium hydroxide was 25 g instead of 70 g. Reaction vessel is a 30 mL beaker in a 30° C. water bath. Begin with 15 g of hypochlorite/sodium hydroxide solution. Over two minutes, add a proportionate amount of ferric nitrate nonahydrate crystals (4.8 g). Begin pumping bleach into the vessel at a rate of 1.2 g per minute. Simultaneously, continuously feed iron crystals into the vessel at a rate of 0.24 g per minute. Stop after 20 minutes, this point in time becomes time=0 in the table below. During this period the maximum temperature was 40° C. but mostly a temperature of close to 30° C. was maintained. After the additions were stopped samples were taken for spectrophotometric analysis.

| Time, min | Actual weight, gm | Expected absorbance | Actual absorbance | Fraction of Iron in the (VI) state | Actual reaction temperature, ° C. |
|---|---|---|---|---|---|
| 0 | 0.3267 | 2.93 | 1.121 | 0.38 | 30.1 |
| 10 | 0.3284 | 2.94 | 1.294 | 0.44 | 28.8 |
| 20 | 0.3550 | 3.18 | 1.466 | 0.46 | 28.2 |

Example 10

Literature Preparation of Ferrate(VI)

Ferrate was synthesized using a recipe given by Audette and Quail, Inorganic Chemistry 11 (8) 1904 (1972).

| | Recipe | | | IC 11(8) 1904 (1972) Experimental Procedure | |
|---|---|---|---|---|---|
| Ingredient | Weight, grams | Moles | Moles | Experimental Procedure | On a 75 grams of water basis |
| Water | 75 | | | 10 | 75 |
| 1st NaOH | 30 | | 0.10 | 4 | 30 |
| Cl₂ (gas) | 6.5 | 0.092 | 0.038 0.29 (75 g water basis) | 2.7 | 20.25 |
| 2nd NaOH | 70 | | 0.24 | 9.6 | 72 |
| Ferric Nitrate Nonahydrate | 25 | 0.062 | 0.005 | 2.02 | 15 |

Example 11

Procedure for the Synthesis of Ferrate (VI)

Take a small sample bottle and record its tare weight to the nearest 0.01 grams. Inside a dry box, weigh 30 g of sodium hydroxide into a 300 mL fleaker, 70 g of sodium hydroxide into a 150 mL fleaker, and 5.0 g of ferric nitrate nonahydrate into the sample bottle. Cap each vessel. Take the three vessels out of the dry box. Re-weigh and record the weight of the small sample bottle to the nearest 0.01 grams. Add 75 g of deionized water to the large fleaker. Re-cap the large fleaker and set it in ice.

Take the cap off the large fleaker, put a TEFLON coated stirring bar in it, weigh it and record the weight. Set the fleaker in a large crystallizing dish on a stirring plate, add ice to the crystallizing dish to above the level of the solution, and start the stirring. Put a glass thermometer in the solution.

Clean and dry the delivery tip from a chlorine delivery system. Start the chlorine addition into the sodium hydroxide solution. Make sure the sodium hydroxide solution does not back up into the delivery tube toward the chlorine cylinder. Watch for the speed of bubbles and don't go too fast. Watch the temperature and keep it below 20° C. Periodically check the weight of the fleaker plus contents and stop the chlorine addition when enough chlorine has been added (20 g of chlorine in this example). Record the weight of the fleaker plus contents.

Put the flask back in the ice bath with the thermometer. Slowly begin adding the second aliquot of NaOH. Watch the temperature closely; it is preferably around 25° C. Filter the mixture through the fritted glass filter. Put forty grams of filtrate in a 50 mL beaker with a short stirring bar. Put the beaker in the crystallizing dish and add water and ice or heat as necessary to establish the temperature at the set point. Put a thermocouple in the reaction vessel.

Begin adding ferric nitrate nonahydrate crystals from the small sample vial and simultaneously begin recording the temperature of the contents of the reaction vessel. It will take four or five minutes to add the ferric crystals. Once the purple color is strongly in evidence, begin taking samples for ferrate (VI) analysis.

Example 12

Preparation of Ferrate(VI)

Ferrate is synthesized using the procedure of Example 1, except 23.1 g of chlorine was used instead of 6.5 g. 40 g of coarse glass frit filtered bleach in saturated sodium hydroxide solution was added to a 50 mL Pyrex beaker with a TEFLON® stirring bar. The beaker was placed in a large crystallizing dish on a magnetic stirrer plate. The water bath maintained a temperature of 26-27° C. 5 g of ferric nitrate nonahydrate was added over a period of three minutes to begin the experiment*. During this step, the mixture foamed up slightly causing the iron nitrate crystals to tend to float on the foam and not mix in. At six minutes the mixture was a dark purple color and sampling was initiated by taking about 0.3 g and diluting to 100 g with cold buffer solution. Six minutes coincided with the peak mixture temperature, 42° C. During the next few minutes, the foam continued to rise.

| Time, min* | Actual Wt, gm | Expected Absorbance | Observed Absorbance | Fraction of Iron in (VI) State | Actual Reaction Temperature, ° C. |
|---|---|---|---|---|---|
| 6 | 0.31 | 0.97 | 0.14 | 0.14 | 42 |
| 8 | 0.33 | 1.03 | 0.25 | 0.24 | 35 |
| 10 | 0.31 | 0.97 | 0.24 | 0.25 | 31 |
| 16 | 0.31 | 0.97 | 0.27 | 0.28 | 27.5 |
| 22 | 0.34 | 1.06 | 0.30 | 0.28 | |
| 31 | 0.32 | 1.00 | 0.29 | 0.29 | |
| 46 | 0.32 | 1.00 | 0.30 | 0.29 | |

*Timing began with the start of ferric nitrate nonahydrate addition.

Example 13

Preparation of Ferrate(VI)

Ferrate is synthesized using the procedure of Example 1, except 12 g of chlorine was used instead of 6.5 g. Reaction vessel is a jacketed beaker maintained at 35° C. Begin with 20 g of hypochlorite/sodium. Gradually add 1.6 g of ferric nitrate nonahydrate crystals. This is a 5 fold stoichiometric excess of hypochlorite over ferric(III). The maximum temperature achieved during this step was 39° C.

| Time, min | Actual weight, gm | Expected absorbance | Actual absorbance | Fraction of Iron in the (VI) state | Actual reaction temperature, ° C. |
|---|---|---|---|---|---|
| 15 | 0.3233 | 1.36 | 0.86 | 0.63 | 35.2 |
| 30 | 0.3427 | 1.44 | 1.14 | 0.79 | 35.2 |
| 45 | 0.2984 | 1.26 | 1.10 | 0.87 | 35.2 |
| 60 | 0.3289 | 1.39 | 1.25 | 0.90 | 35.2 |

Example 14

Loop Reactor Procedure

A jacketed mixing vessel set to control the temperature at 30° C. is used. A reactor vessel in the form of a tube is used with a controlled temperature setting of 35° C. A multi-head variable speed peristaltic pump set to deliver sodium hypochlorite solution to the mixing chamber at a speed of approximately 30 mg/sec is used. Another tube on the pump head is used to transfer mixture from the mixing chamber to the reactor tube.

Prepare a sample vial with more than 10 g of ferric nitrate nonahydrate, record its weight. Prepare another sample vial with ferric nitrate nonahydrate to deliver 3.42 g. Add 17.1 grams of sodium hypochlorite solution to the mixing chamber. Begin the mixing. Gradually add 3.42 g of ferric nitrate nonahydrate. Begin timing the experiment and begin delivering sodium hypochlorite solution from the peristaltic pump. At one minute intervals, add 0.342 grams of crystals (measured visually) into the mixing chamber. After the 5 minute add, begin transferring reaction mixture to the loop by positioning the inlet of the peristaltic pump transfer tube at the surface of the reaction mixture. After the 10, 15 and 20 minute add, record the weight of the crystal vial. After the 20 minute add, stop delivering sodium hypochlorite solution and stop adding crystals. Re-position the inlet to the peristaltic pump transfer tube to near the bottom of the mixing vessel and continue pumping from there to the Loop reactor. When the Mixing Chamber is empty, stop the peristaltic pump. At 60 minutes, get a sample of the product from the outlet end of the loop reactor and measure its absorbance. At 80 minutes, get a sample of the product from the inlet end of the loop reactor and measure its absorbance.

Example 15

Preparation of Ferrate(VI)

Ferrate is synthesized using the procedure of Example 1. 40 g of coarse glass frit filtered bleach in saturated sodium hydroxide solution is added to a 50 mL Pyrex beaker with a TEFLON® stirring bar. The beaker is placed in a large crystallizing dish on a magnetic stirrer plate. The crystallizing dish has a water/ice mixture to maintain a temperature of 19-20° C. 5 g of ferric nitrate nonahydrate is added over a period of four minutes to begin the experiment. The iron salt distributes through the mixture but there is no visually apparent activity for a few minutes. The temperature of the reaction mixture does slowly elevate. Relatively suddenly, the mixture turns dark purple. This happened 10 minutes after the start of the iron addition, simultaneously, the reaction temperature peaked at 31° C. At this point, a timer is started for the taking of samples for Ferrate(VI) analysis. The water/ice bath maintained a constant temperature of 19-20° C.

| Time, min | Actual Wt, gm | Expected Absorbance | Observed Absorbance | Fraction of Iron in (VI) State | Actual Reaction Temperature, ° C. |
|---|---|---|---|---|---|
| 2 | 0.30 | 0.95 | 0.37 | 0.39 | 29 |
| 6 | 0.39 | 1.24 | 0.66 | 0.53 | 26 |
| 10 | 0.31 | 0.98 | 0.55 | 0.56 | 23 |
| 15 | 0.32 | 1.02 | 0.64 | 0.63 | 22 |
| 25 | 0.30 | 0.95 | 0.64 | 0.67 | — |
| 35 | 0.29 | 0.92 | 0.66 | 0.72 | — |
| 45 | 0.33 | 1.05 | 0.76 | 0.72 | — |
| 60 | 0.31 | 0.98 | 0.71 | 0.72 | — |

Example 16

Preparation of Ferrate(VI)

40 grams of coarse glass frit filtered bleach solution is added to a 50 mL jacketed reaction vessel with a TEFLON® stirring bar. Controlled temperature water is circulated through the jacket to control and establish the reaction temperature. Five grams of ferric nitrate nonahydrate is added over a period of a few minutes to begin the experiment.

| Time, min | Actual Wt, gm | Expected Absorbance | Observed Absorbance | Fraction of Iron in (VI) State | Actual Reaction Temperature, 0 C. | Notes |
|---|---|---|---|---|---|---|
| Temp control point 30° C. | | | | | | |
| 0 | | | | | 22.4 | Begin iron addition |
| 2 | | | | | 27 | Complete iron addition |
| 2.5 | | | | | 30 | |
| 3.5 | | | | | 33.9 | Beginning of reaction noted |
| 5 | 0.33 | 1.04 | 0.25 | 0.24 | 31.1 | |

-continued

| Time, min | Actual Wt, gm | Expected Absorbance | Observed Absorbance | Fraction of Iron in (VI) State | Actual Reaction Temperature, 0 C. | Notes |
|---|---|---|---|---|---|---|
| 10 | 0.32 | 1.01 | 0.40 | 0.40 | 30.7 | |
| 17 | 0.31 | 0.98 | 0.48 | 0.49 | 30.4 | |
| 25 | 0.33 | 1.04 | 0.59 | 0.57 | 30.4 | |
| 35 | 0.32 | 1.01 | 0.60 | 0.59 | 30.3 | |
| 45 | 0.34 | 1.08 | 0.695 | 0.64 | 30.5 | |
| Temp control point 35° C. | | | | | | |
| 0 | | | | | 24 | Begin iron addition |
| 2 | | | | | 28.6 | Complete iron addition |
| 2.5 | | | | | 32 | |
| 3.5 | | | | | 37 | Beginning of reaction noted |
| 5 | 0.32 | 0.285 | 1.01 | 0.28 | 36 | |
| 10 | 0.34 | 0.52 | 1.08 | 0.48 | 35.4 | |
| 17 | 0.34 | 0.61 | 1.08 | 0.56 | 35.3 | |
| 25 | 0.34 | 0.67 | 1.08 | 0.62 | 35.3 | |
| 35 | 0.31 | 0.68 | 0.98 | 0.69 | 35.3 | |
| 45 | 0.34 | 0.813 | 1.08 | 0.75 | 35.3 | |
| 60 | 0.43 | 1.11 | 1.36 | 0.82 | 35.2 | |

Example 17

Preparation of Ferrate(VI)

Reaction vessel is a 30 mL beaker in a 30° C. water bath. Begin with 15 g of hypochlorite/sodium hydroxide solution. Over two minutes, add a stoichiometric amount of ferric nitrate nonahydrate crystals (3 g). Begin pumping bleach into the vessel at a rate of 1.2 g per minute. Simultaneously, continuously feed iron crystals into the vessel at a rate of 0.24 g per minute. Stop after 20 minutes, this point in time becomes time=0 in the table below. During this period the maximum temperature was 40° C. but mostly a temperature of close to 30° C. was maintained. After the additions were stopped samples were taken for spectrophotometric analysis.

| Time, min | Actual weight, gm | Expected absorbance | Actual absorbance | Fraction of Iron in the (VI) state | Actual reaction temperature, 0 C. |
|---|---|---|---|---|---|
| 0 | 0.3267 | 2.93 | 1.121 | 0.38 | 30.1 |
| 10 | 0.3284 | 2.94 | 1.294 | 0.44 | 28.8 |
| 20 | 0.3550 | 3.18 | 1.466 | 0.46 | 28.2 |

Example 18

Treatment of Ballast Water with Ferrate

Objectives.

The objectives of this proposed research are to conduct a laboratory-scale investigation of the effectiveness of ferrate to eliminate phytoplankton, microorganisms, and zooplankton from ship ballast water and to optimize the process with respect to efficiency, cost, and implementation.

Work Plan.

To accomplish project objectives, the following tasks are proposed: (1) enumerate microorganism, phytoplanktons, and invertebrates in sea water before and after ferrate addition, conduct tests under various contact times, dosage, and environmental conditions (pH, salinity, and turbidity); and, (2) pilot scale testing of ferrate treatment on sea water dockside at the Port of Cape Canaveral; and, (3) based on results of laboratory and dockside test findings, conduct a feasibility study for full-scale implementation.

Preparation of Ferrate.

A bench-scale ferrate reactor, as described in U.S. patent application Ser. No. 10/647,137, entitled "Apparatus for synthesizing an oxidant," by Powell et al., filed Aug. 21, 2003, which is incorporated by reference herein in its entirety, with a capacity of 40 L is available for the synthesis of ferrate.

Sample Handling.

Five hundred ml of seawater, collected from Florida coastal areas, is treated with ferrate under sterile conditions and stirred for predetermined periods of time (see experimental design). Marine organisms are enumerated prior to and following ferrate treatment. Seawater is also filtered using 100-μm filters to simulate physical separation pretreatment and similarly treated.

Experimental Design.

The survival of marine microorganisms, phytoplankton, and macroflora/fauna in seawater is evaluated before and after the addition of ferrate. Untreated water acts as a control to determine the health of the organisms in the bioassays. In all trials, proportional data are arcsine square root transformed prior to statistical analyses to increase normality of means and eliminate variances that are heterogeneous between treatments. A nested ANOVA is run to determine if the ferrate was toxic to the test organisms, as a function of dose (5, 10, 25, 50 mg/L or higher as determined by organism survival), contact time (5, 10, 30, and 60 minutes or higher as determined by organism survival), turbidity (1, 5, 10 NTU, adjusted if necessary by kaolin addition), and salinity (duplicating coastal and mid-ocean conditions). In addition, to examine re-growth potential, treated samples are stored in the dark for seven and 90 days at room temperature and retested for organism survival.

Invertebrate Analysis.

For each species listed below, methods similar to those described in Walters et al. (1996) is used. Three separate trials are run for each test species to account for any potential genetic or handling problems. In each trial, 20 replicate sterile, disposable petri dishes (60×15 mm or larger, if needed) are filled with 15 ml of 0.45-µm filtered seawater. An additional 20 dishes contain equal amounts of filtered seawater to which various doses of ferrate are added. Survival of organisms are enumerated after 30 minutes, 1, 3, 6, 12, 24 and 36 hours or less if all individuals in the treatment dishes die.

Microbiological Analysis.

Microorganism plate counts re determined using the method described in American Public Health Association (1998). Heterotrophic bacteria, total colifoms, and *Escherichia coli* are enumerated. All glassware are washed with detergent and water, rinsed at least two times with a 1:1 HCl solution, rinsed at least three times with distilled water, dried and capped with aluminum foil, and heated at 525° C. for 6 hours. Samples are collected in carbon-free bottles and transferred to sterile sample containers, then stored at 4° C. and analyze within 24 hours. For heterotrophic bacteria, samples are diluted as needed using sterile buffered water. Using a 10-100 µL pipet, 100 µL of sample is placed in the center of a NWRI agar plate, which is then placed on the turntable. The glass spreader is dipped into isopropyl alcohol and a flame then cooled under a hood, placed in the middle of the sample and gently moved back and forth until the sample is spread across the entire glass rod. After preparation the plate is inverted and placed in a 35° C. incubator for 48 hours. Samples are removed from the incubator within 48 hours of experiment and visible colonies counted for all dilutions. Total coliforms and *E. Coli* are enumerated using Colilert (IDEXX Laboratories) a commercially available detection kit. *Pseudomonas aeruginosa* and *K. pneumoniae* is used as standards.

Phytoplankton Analysis.

All glassware are washed with detergent and water, rinsed at least two times with a 1:1 HCl solution, rinsed at least three times with distilled water, dried and capped with aluminum foil, and heated at 525° C. for 6 hours. HESNW growth medium is added to 50-ml samples of treated and untreated seawater to bring the final volume to 200 ml. Sub-samples are obtained, preserved, settled and viewed microscopically according to the Utermohl method (Sutherland et al, 2001).

CONCLUSION

Thus, those of skill in the art will appreciate that the methods, devices, and uses herein provide a relatively easy and economical way of producing ferrate in close proximity to the site of use.

One skilled in the art will appreciate that these methods and devices are and may be adapted to carry out the objects and obtain the ends and advantages mentioned, as well as those inherent therein. The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the claims.

It will be apparent to one skilled in the art that varying substitutions and modifications may be made to the invention disclosed herein without departing from the scope and spirit of the invention.

Those skilled in the art recognize that the aspects and embodiments of the invention set forth herein may be practiced separate from each other or in conjunction with each other. Therefore, combinations of separate embodiments are within the scope of the invention as claimed herein.

All patents and publications mentioned in the specification are indicative of the levels of those skilled in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups, those skilled in the art will recognize that the invention is also thereby described in terms of any individual member or subgroup of members of the Markush group. For example, if X is described as selected from the group consisting of bromine, chlorine, and iodine, claims for X being bromine and claims for X being bromine and chlorine are fully described.

Other embodiments are within the following claims.

What is claimed is:

1. A method of continuously synthesizing ferrate, comprising:
   a) continuously providing an aqueous solution comprising an iron salt in a reaction chamber, where the reaction chamber comprises at least two electrodes;
   b) providing sufficient electric current to the at least two electrodes to convert at least a portion of the iron salt to ferrate;
   c) delivering at least a portion of the ferrate to a site of use that is proximal to the reaction chamber; and
   d) adding additional aqueous solution to the reaction chamber.

2. The method of claim 1, wherein the additional aqueous solution added of step (d) is in an amount sufficient to substantially replace the portion of the ferrate delivered from the reaction chamber of step (c).

3. The method of claim 1, further comprising adding a base to the aqueous solution of step (a).

4. The method of claim 1, further comprising adding an acid to the aqueous solution of step (a).

5. The method of claim 1, wherein the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, and combinations thereof.

6. The method of claim 1, further comprising adding an iron salt to the aqueous solution of step (a).

7. The method of claim 1, wherein at least one electrode comprises an iron electrode.

8. The method of claim 7, further comprising dissolving the iron electrode to form iron salt in the aqueous solution of step (a).

9. A method for treating water, comprising:
a) continuously providing an aqueous solution comprising an iron salt in a reaction chamber, where the reaction chamber comprises at least two electrodes;
b) providing sufficient electric current to the at least two electrodes to convert at least a portion of the iron salt to a ferrate;
c) delivering at least a portion of the ferrate to a site of use that is proximal to the reaction chamber;
d) adding additional aqueous solution to the reaction chamber; and
e) contacting the ferrate with the water.

10. The method of claim 9, wherein the additional aqueous solution added of step (d) is in an amount sufficient to substantially replace the portion of the ferrate delivered from the reaction chamber of step (c).

11. The method of claim 9, further comprising adding a base to the aqueous solution of step (a).

12. The method of claim 9, further comprising adding an acid to the aqueous solution of step (a).

13. The method of claim 9, wherein the iron salt is selected from the group consisting of ferric nitrate, ferrous nitrate, ferric chloride, ferrous chloride, ferric bromide, ferrous bromide, ferric sulfate, ferrous sulfate, ferric phosphate, ferrous phosphate, ferric hydroxide, ferrous hydroxide, ferric oxide, ferrous oxide, ferric hydrogen carbonate, ferrous hydrogen carbonate, ferric carbonate, and ferrous carbonate, and combinations thereof.

14. The method of claim 9, further comprising adding an iron salt to the aqueous solution of step (a).

15. The method of claim 9, wherein at least one electrode comprises an iron electrode.

16. The method of claim 15, further comprising dissolving the iron electrode to form iron salt in the aqueous solution of step (a).

17. The method of claim 9, wherein the water is selected from the group consisting of waste water, ground water, sewage, drinking water, recreational water, ballast water, and bilge water.

* * * * *

UNITED STATES PATENT AND TRADEMARK OFFICE
CERTIFICATE OF CORRECTION

PATENT NO. : 7,820,025 B2
APPLICATION NO. : 12/352405
DATED : October 26, 2010
INVENTOR(S) : Lee Edward Ciampi and Luke J. Daly It is certified that error appears in the above-identified patent and that said Letters Patent is hereby corrected as shown below:

On the Title Page:
At column 2, Line 38, Under Other Publications, please change "Toxicaology" to --Toxicology--.

Page 2, at column 1, Line 16, Under Other Publications, change "aquenous" to --aqueous--.

Page 2, at column 1, Line 27, Under Other Publications, change "($FEO_{4-2}$)" to --($FeO_4^{-2}$)--.

Page 2, at column 1, Line 35, Under Other Publications, change "($FeO_{42-}$)$^{1"}$," to --($FeO_4^{2-}$)$^{1"}$,--.

Page 2, at column 1, Line 46, Under Other Publications, change "sphaeroblus" to --sphaerotilus--.

Page 2, at column 1, Line 49, Under Other Publications, change "inactiviation" to --inactivation--.

Page 2, at column 1, Line 52, Under Other Publications, change "fluvic" to --fulvic--.

Page 2, at column 2, Line 56, Under Other Publications, change "$FeO_4\,_2$"," to --$FeO_4^{2"}$,--.

Page 2, at column 2, Line 58, Under Other Publications, change "engergy" to --energy--.

In the Specifications:

At column 3, Line 2, change "(beta-$Fe_2O_3.H_2O$)," to --(beta-$Fe_2O_3 \cdot H_2O$),--.

At column 15, Line 14, change "$2K_3FeO_4$" to --2 $K_2FeO_4$--.

At column 25, Line 48, change "ethylenediaminetetracetate" to --ethylenediaminetetraacetate--.

At column 25, Line 66, change "diazion," to --diazinon,--.

Signed and Sealed this
Twelfth Day of April, 2011

David J. Kappos
*Director of the United States Patent and Trademark Office*

CERTIFICATE OF CORRECTION (continued)
U.S. Pat. No. 7,820,025 B2

At column 26, Line 31, change "trifluaraline" to --trifluraline--.

At column 26, Line 39, change "byproducts" to --by-products--.

At column 27, Line 44, change "byproducts" to --by-products--.

At column 29, Line 14, change "biosolidsfrom" to --biosolids from--.

At column 33, Line 13-14, change "Survirvorship" to --Survivorship--.

At column 33, Line 52, change "glutaraldehye" to --glutaraldehyde,--.

At column 35, Line 14, change "Eschericha" to --Escherichia--.

At column 42, Line 49, change "Fe(NO$_3$)$_3$.9H$_2$O" to --Fe(NO$_3$)$_3$•9H$_2$O--.

At column 42, Line 62, change "mL" to --50 mL--.

At column 42, Line 66, change "Fe(NO$_3$)$_3$.9H$_2$O" to --Fe(NO$_3$)$_3$•9H$_2$O--.

At column 55, Line 11, change "colifoms," to --coliforms,--.